(12) United States Patent
Ding et al.

(10) Patent No.: US 11,653,383 B2
(45) Date of Patent: May 16, 2023

(54) TECHNIQUES FOR PERFORMING RANDOM ACCESS PROCEDURES IN SIDELINK WIRELESS COMMUNICATIONS

(71) Applicant: QUALCOMM Incorporated, San Diego, CA (US)

(72) Inventors: Ling Ding, Chester, NJ (US); Junyi Li, Franklin Park, NJ (US); Sony Akkarakaran, Poway, CA (US); Jung Ho Ryu, Fort Lee, NJ (US); Tianyang Bai, Somerville, NJ (US); Qian Zhang, Basking Ridge, NJ (US); Kiran Venugopal, Raritan, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 17/166,426

(22) Filed: Feb. 3, 2021

(65) Prior Publication Data

US 2021/0298068 A1    Sep. 23, 2021

Related U.S. Application Data

(60) Provisional application No. 62/993,460, filed on Mar. 23, 2020.

(51) Int. Cl.
*H04W 74/00* (2009.01)
*H04W 74/08* (2009.01)

(52) U.S. Cl.
CPC ...... *H04W 74/006* (2013.01); *H04W 74/004* (2013.01); *H04W 74/008* (2013.01); *H04W 74/0833* (2013.01)

(58) Field of Classification Search
CPC ............ H04W 74/004; H04W 74/006; H04W 74/008; H04W 74/0833
See application file for complete search history.

(56) References Cited

U.S. PATENT DOCUMENTS

| 10,555,353 | B2 * | 2/2020 | Kitagawa | .......... H04W 72/0453 |
| 10,721,748 | B2 * | 7/2020 | Kalhan | ................ H04B 7/2615 |

(Continued)

FOREIGN PATENT DOCUMENTS

WO      2014087556 A1    6/2014

OTHER PUBLICATIONS

International Search Report and Written Opinion—PCT/US2021/016595—ISA/EPO—dated May 21, 2021.

(Continued)

*Primary Examiner* — Liton Miah
(74) *Attorney, Agent, or Firm* — Arent Fox, LLP

(57) ABSTRACT

Some aspects described herein relate to configuring user equipment (UE) for performing sidelink (SL) random access (RA) procedures, which may include assistance from a base station or other network component. One or more parameters for performing a random access procedure with a second UE over a sidelink can be received from a base station. A first random access message can be transmitted to the second UE as part of the random access procedure over the sidelink. A second random access message can be received, from the second UE, in response to transmitting the first random access message, and as part of the random access procedure over the sidelink, where at least one of transmitting the first random access message or receiving the second random access message are based on the one or more parameters.

14 Claims, 13 Drawing Sheets

(56) References Cited

U.S. PATENT DOCUMENTS

| | | | | |
|---|---|---|---|---|
| 10,805,926 B2* | 10/2020 | Heo | .................. | H04L 5/0032 |
| 10,887,933 B2* | 1/2021 | Feng | .................. | H04W 8/24 |
| 11,153,915 B2* | 10/2021 | Xiang | .................. | H04L 5/00 |
| 11,218,929 B2* | 1/2022 | Wu | .................. | H04W 72/042 |
| 2014/0204847 A1* | 7/2014 | Belleschi | .............. | H04W 76/14 |
| | | | | 370/329 |
| 2014/0206322 A1 | 7/2014 | Dimou et al. | | |

OTHER PUBLICATIONS

Nokia, et al., "Initial Access Signals and Channels for NR-U", 3GPP Draft, R1-1912278, 3GPP TSG RAN WG1 Meeting #99, 3rd Generation Partnership Project (3GPP), Mobile Competence Centre, 650, Route Des Lucioles, F-06921 Sophia-Antipolis Cedex, France, vol. RAN WG1. No. Reno. Nevada, USA, Nov. 18, 2019-Nov. 22, 2019, (Nov. 8, 2019), 14 Pages, Retrieved from the Internet: URL:https://ftp.3gpp.org/tsg_ran/WG1_RL1/TSGR1_99/Docs/R1-1912278.zip R1-1912278_Initial Access Signals and Channels_NOKIA.docx [retrieved on Nov. 8, 2019] Section 3.2.

* cited by examiner

TECHNIQUES FOR PERFORMING RANDOM ACCESS PROCEDURES IN SIDELINK WIRELESS COMMUNICATIONS

CLAIM OF PRIORITY UNDER 35 U.S.C. § 119

The present application for patent claims priority to Provisional Patent Application No. 62/993,460, entitled "TECHNIQUES FOR PERFORMING RANDOM ACCESS PROCEDURES IN SIDELINK WIRELESS COMMUNICATIONS" filed Mar. 23, 2020, which is assigned to the assignee hereof and hereby expressly incorporated by reference herein for all purposes.

BACKGROUND

Aspects of the present disclosure relate generally to wireless communication systems, and more particularly, to performing random access procedures.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, user equipment (UEs) communicate over one or more of multiple interfaces. The multiple interfaces may include a Uu interface between the UE and a base station, where the UE can receive communications from the base station over a downlink and transmit communications to the base station over an uplink. In addition, the multiple interfaces may include a sidelink interface to communicate with one or more other UEs directly over a sidelink channel (e.g., without traversing the base station).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications by a first user equipment (UE) is provided that includes receiving, from a base station, one or more parameters for performing a random access procedure with a second UE over a sidelink, transmitting, to the second UE, a first random access message as part of the random access procedure over the sidelink, and receiving, from the second UE and in response to transmitting the first random access message, a second random access message as part of the random access procedure over the sidelink, wherein at least one of transmitting the first random access message or receiving the second random access message are based on the one or more parameters.

In another example, a method for wireless communications by a first UE is provided that includes receiving, from a base station, one or more parameters for performing a random access procedure with a second UE over a sidelink, receiving, from the second UE, a first random access message as part of the random access procedure over the sidelink, and transmitting, to the second UE and in response to receiving the first random access message, a second random access message as part of the random access procedure over the sidelink, wherein at least one of receiving the first random access message or transmitting the second random access message are based on the one or more parameters.

In another example, a method for wireless communications by a base station is provided that includes receiving, from a first UE, a request to perform a random access procedure with a second UE over a sidelink, generating one or more parameters for the first UE to perform the random access procedure with the second UE over the sidelink, and transmitting the one or more parameters to the first UE and the second UE.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

For example, an apparatus for wireless communication is provided that includes a transceiver, a memory configured to store instructions, and one or more processors communicatively coupled with the transceiver and the memory. The one or more processors are configured to receive, from a base station, one or more parameters for performing a random access procedure with a second UE over a sidelink, transmit, to the second UE, a first random access message as part of the random access procedure over the sidelink, and receive, from the second UE and in response to transmitting the first random access message, a second random access message as part of the random access procedure over the sidelink, wherein at least one of transmitting the first random access message or receiving the second random access message are based on the one or more parameters.

In another example, an apparatus for wireless communication is provided that includes a transceiver, a memory configured to store instructions, and one or more processors communicatively coupled with the transceiver and the memory. The one or more processors are configured to receiving, from a base station, one or more parameters for performing a random access procedure with a second UE over a sidelink, receiving, from the second UE, a first random access message as part of the random access procedure over the sidelink, and transmitting, to the second UE and in response to receiving the first random access message, a second random access message as part of the random access procedure over the sidelink, wherein at least one of receiving the first random access message or transmitting the second random access message are based on the one or more parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
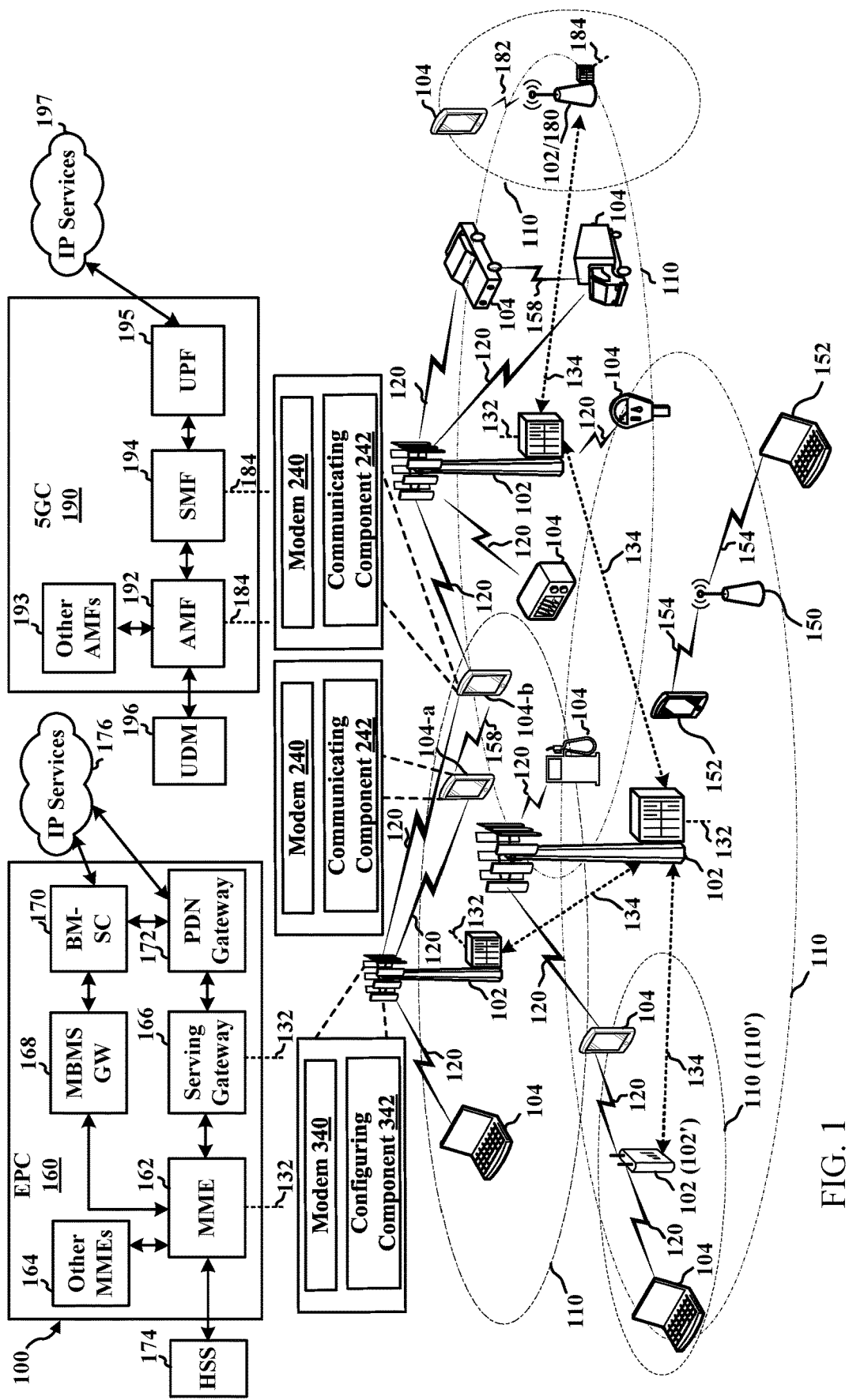
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to performing random access procedures between devices in sidelink communications. For example, sidelink communications can refer to device-to-device (D2D) communication among devices (e.g., user equipment (UEs)) in a wireless network. In a specific example, sidelink communications can be defined for vehicle-based communications, such as vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a sidelink channel. Continued support and implementation of V2X communications is provided in fifth generation (5G) new radio (NR) communication technologies, as well as long term evolution (LTE). Though aspects are generally described herein in terms of D2D/V2X communications, the concepts and techniques can be similarly applied more generally to substantially any type of wireless communications.

In an example, a UE may perform a random access procedure with another UE in sidelink communications to establish a connection therewith. For example, a first UE may determine to communicate with a second UE (e.g., directly, such as for gaming, V2X communications, etc.), which may include determining to communicate with any one or more second UEs (e.g., within a communication range), a specific one or more second UEs (e.g., identified by an application-level name or identifier), etc. In any case, the first UE can perform a random access procedure to the second UE, and/or vice versa, or the first UE can perform random access procedures with multiple other UEs (e.g., by performing random access procedure with one UE at a time, etc.). The UEs can also each communicate with a base station (e.g., over a Uu interface or connection), which can assist the UEs in performing the random access procedure with other UEs. For example, the base station can assign radio network temporary identifiers (RNTIs) to the UEs and can know beam related information for each of the UEs, where the beam information may include a set of beams per level per UE. For example, low level can relate to a broad beam and high level can relate to a narrow beam within the broad beam, etc. In addition, for example, the base station can configure the first UE to transmit the first random access message to the second UE or vice versa, and the selection of which UE sends the first random access message can be based on one or more parameters (e.g., an identifier of the UE), a random selection, etc.

In an example, the base station can transmit one or more parameters for performing the random access procedure to the first UE and the second UE, such as an identifier of the UEs or a random access sequence corresponding to the UEs, etc. The UEs can use these parameters to transmit and/or receive random access messages as part of the random access procedure over a sidelink. In one example, the random access procedure may include three or four random access messages transmitted over the sidelink between the UEs, which may include first and second random access messages transmitted over random access resources (e.g., which may be determined with assistance from the base station) and a third and/or fourth random access messages transmitted over sidelink channel resources. In the examples described herein, the base station can assist the UEs in determining various parameters for performing sidelink random access with one another.

The described features will be presented in more detail below with reference to FIGS. 1-13.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for requesting sidelink (SL) random access (RA) and/or performing SL RA, as described further herein. In addition, some nodes may have a modem 340 and configuring component 342 for configuring UEs for performing SL RA, as described herein. Though UEs 104-a and 104-b is shown as having the modem 240 and communicating component 242 and a base station 102 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs (e.g., UE 104-*a* and 104-*b*) may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE 104-a and UE 104-b can communicate with a base station 102 for communicating in the access network 100. In addition, for example, communicating component 242 of the UE 104-a can determine to perform a RA procedure with another UE 104-b (and/or communicating component 242 of the UE 104-b can determine to perform a RA procedure with UE 104-a) and can accordingly request RA configuration from a base station 102.

Configuring component 342 of the base station 102 can configure the UE 104-a and/or UE 104-b with one or more parameters for performing a RA procedure with one another to establish a connection and/or schedule communication resources with one another. For example, configuring component 342 can configure UE 104-a and/or UE 104-b with an indication of resources (e.g., time and/or frequency resources) over which to perform the RA procedure, an indication of beam(s) to use in transmitting and/or receiving RA messages, RA sequences to use in transmitting RA messages, identifiers of the UEs, and/or the like. Communicating components 242 of the UE 104-a and/or UE 104-b can accordingly perform SL RA based at least in part on the parameters received from the base station 102.

Figure 2:
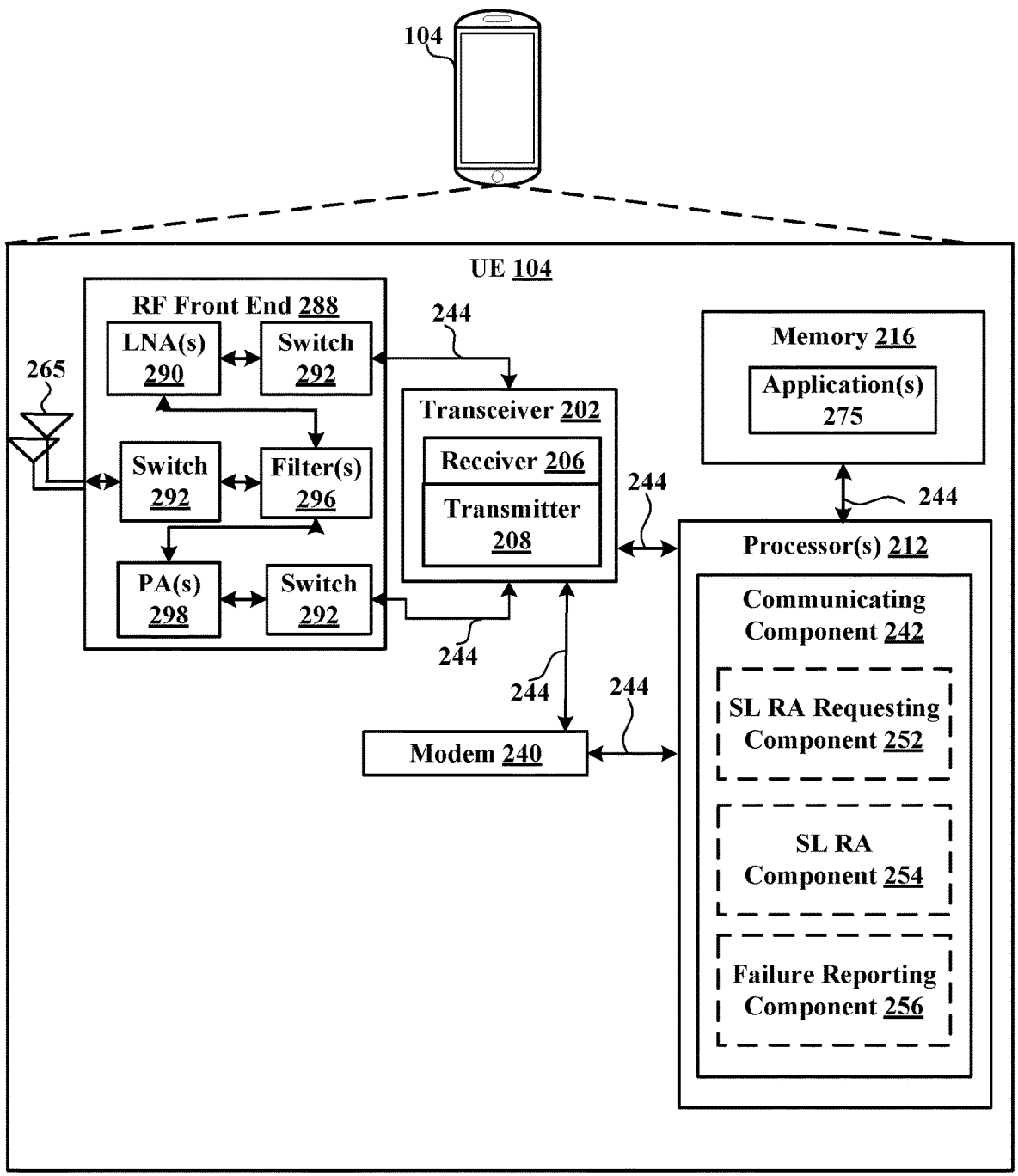
FIG. 2 is a block diagram illustrating an example of a UE, in accordance with various aspects of the present disclosure.
Figure 3:
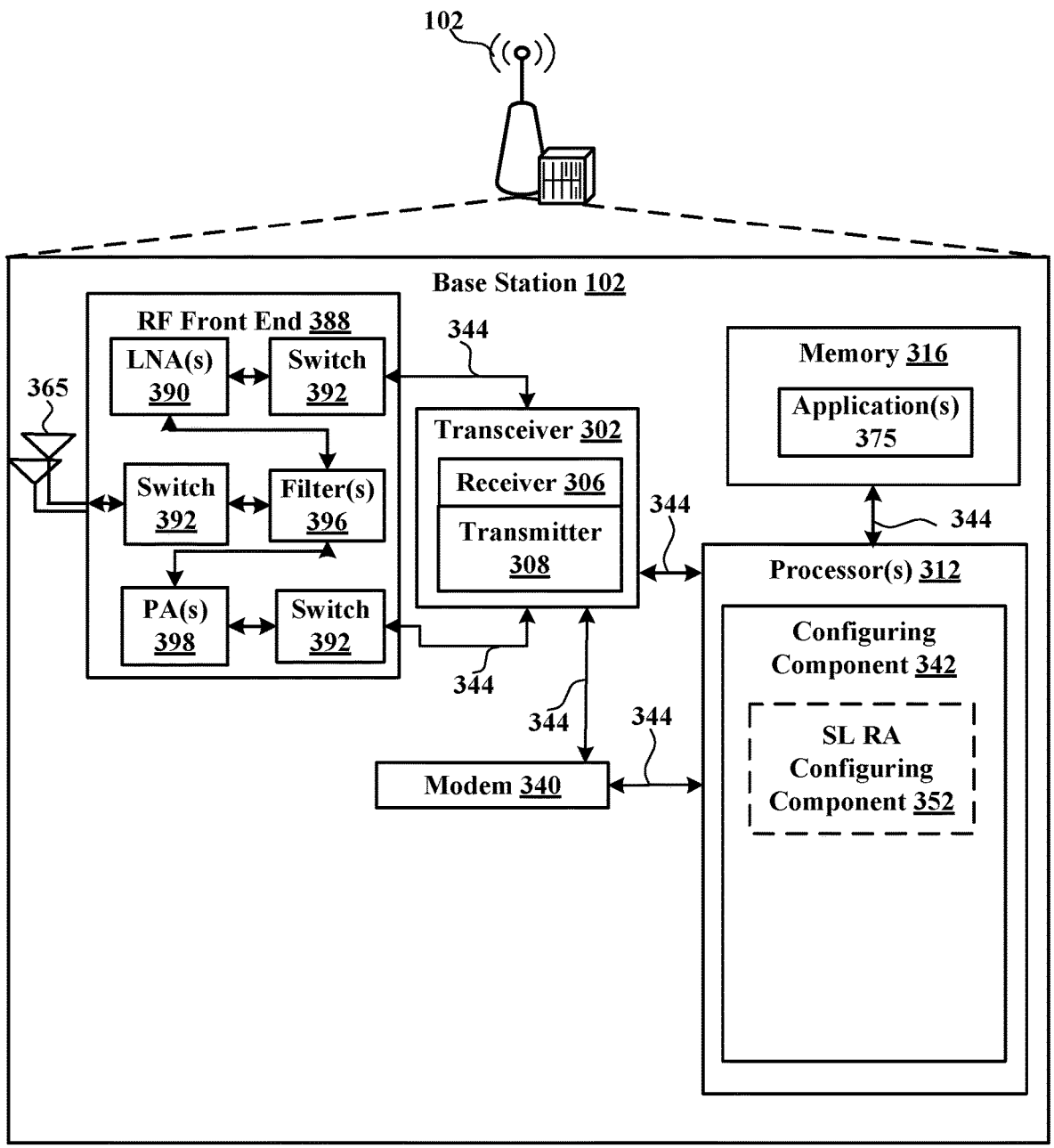
FIG. 3 is a block diagram illustrating an example of a base station, in accordance with various aspects of the present disclosure.
Figure 4:
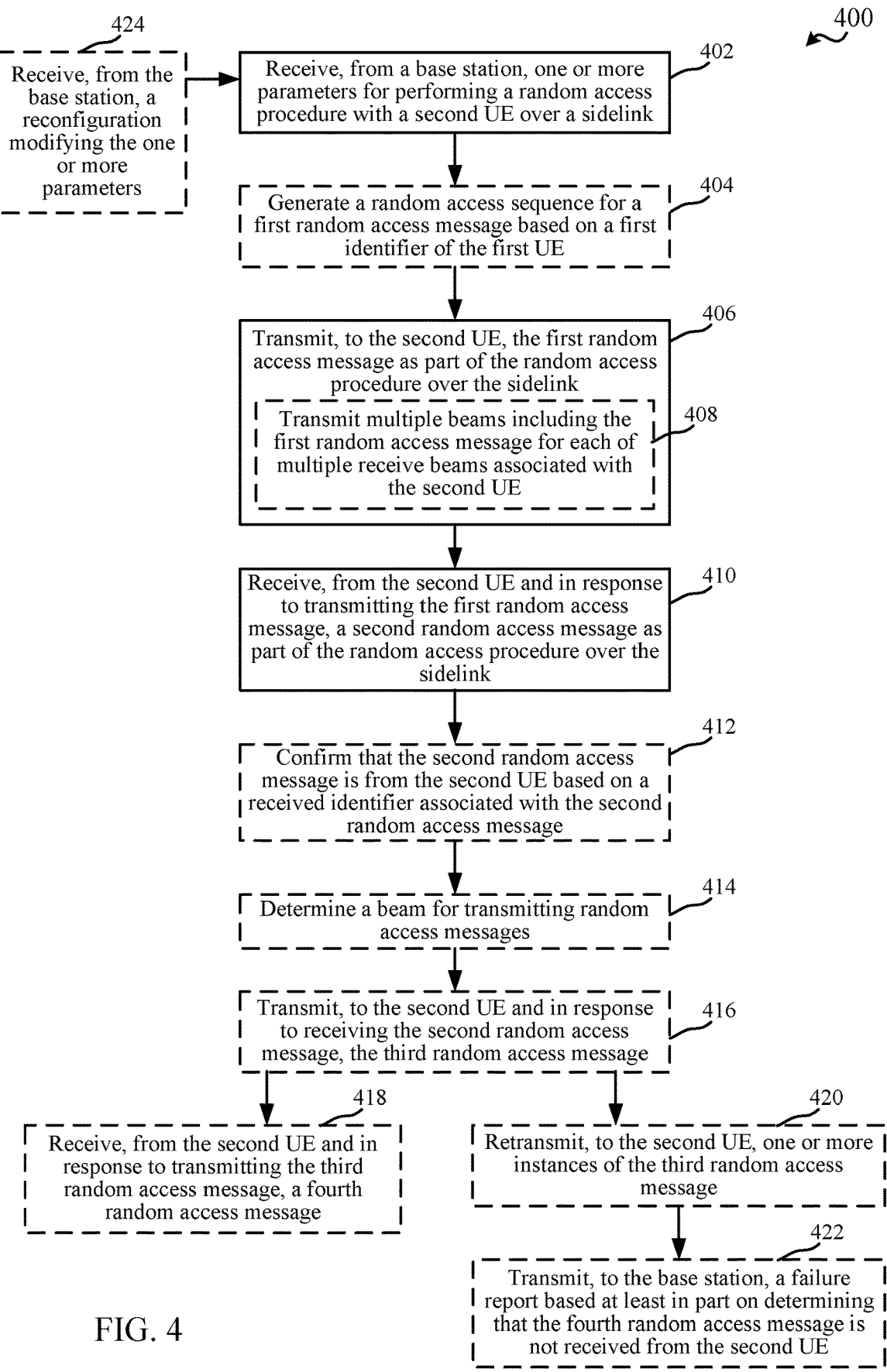
FIG. 4 is a flow chart illustrating an example of a method for performing a sidelink (SL) random access (RA) procedure at least by transmitting a first RA message, in accordance with various aspects of the present disclosure.
Figure 5:
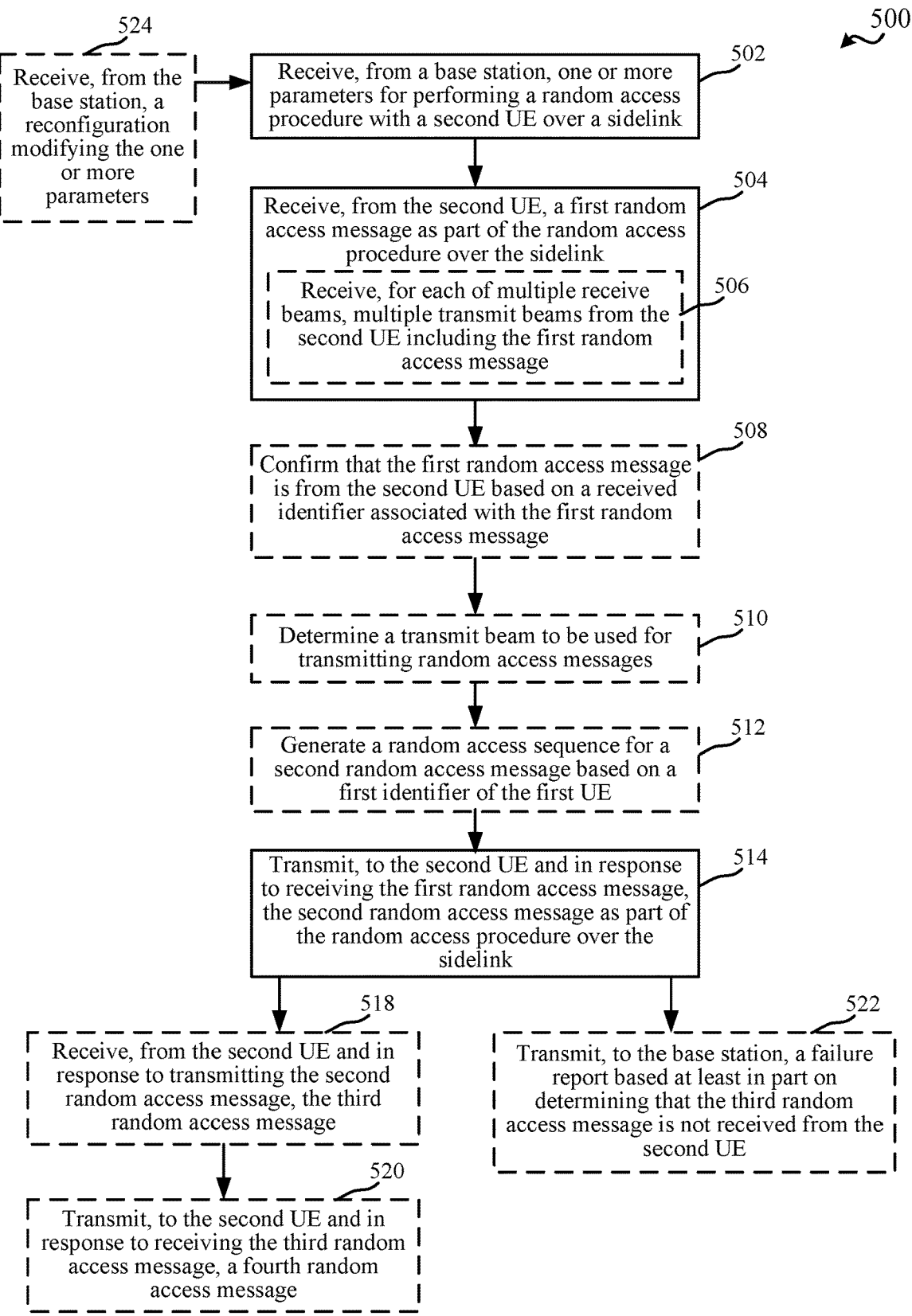
FIG. 5 is a flow chart illustrating an example of a method for performing a SL RA procedure at least by receiving a first RA message, in accordance with various aspects of the present disclosure.
Figure 6:
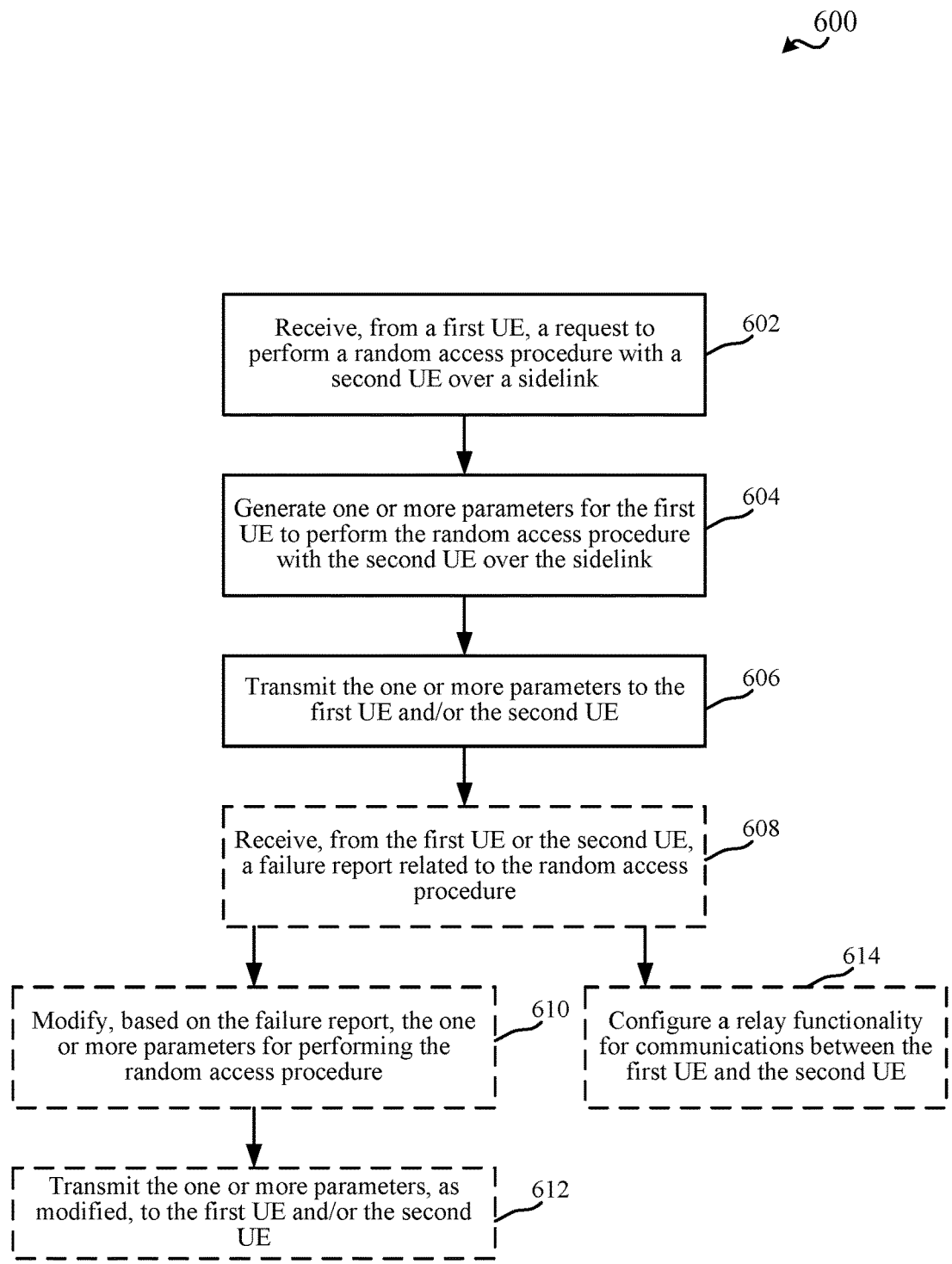
FIG. 6 is a flow chart illustrating an example of a method for configuring devices to perform a SL RA procedure, in accordance with various aspects of the present disclosure.

Turning now to FIGS. 2-13, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for requesting SL RA and/or performing SL RA, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a SL RA requesting component 252 for requesting configuration for performing a SL RA procedure with another UE, a SL RA component 254 for performing a SL RA procedure with another UE, and/or a failure reporting component 256 for reporting an indication of failure of a SL RA procedure to a base station, as described herein.

In an aspect, the processor(s) 212 may correspond to one or more of the processors described in connection with the UE in FIG. 13. Similarly, the memory 216 may correspond to the memory described in connection with the UE in FIG. 13.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring UEs for performing SL RA, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a SL RA configuring component 352 for configuring one or more UEs to perform a SL RA procedure with one another, as described herein.

In an aspect, the processor(s) 312 may correspond to one or more of the processors described in connection with the base station in FIG. 13. Similarly, the memory 316 may correspond to the memory described in connection with the base station in FIG. 13.

FIG. 4 illustrates a flow chart of an example of a method 400 for performing a SL RA procedure by transmitting the first random access message. In an example, a UE (e.g., UE 104-a, as an initially transmitting UE in sidelink communications) can perform the functions described in method 400 using one or more of the components described in FIGS. 1 and 2.

In method 400, at Block 402 (e.g., for an initially transmitting UE 104-a), one or more parameters for performing a random access procedure with a second UE (e.g., UE 104-*b*) over a sidelink can be received. In an aspect, SL RA requesting component 252, e.g., in conjunction with processor(s) 212, memory 216, transceiver 202, communicating component 242, etc., can receive, from the base station, the one or more parameters for performing the RA procedure with the second UE over the sidelink. In an example, SL RA requesting component 252 can receive the one or more parameters based on requesting to perform the SL RA procedure with the second UE. In another example, SL RA requesting component 252 can receive the one or more parameters based on the second UE requesting to perform the SL RA procedure with UE 104, etc. In an example, SL RA requesting component 252 can receive the one or more parameters from the base station 102 in radio resource control (RRC) or other higher layer signaling, in downlink control signaling (e.g., over a physical downlink control channel (PDCCH)), etc.

In method 400, optionally at Block 404, a RA sequence for a first RA message can be generated based on a first identifier of the first UE (e.g., the initially transmitting UE 104-*a*). In an aspect, SL RA component 254, e.g., in conjunction with processor(s) 212, memory 216, transceiver 202, communicating component 242, etc., can generate the random access sequence for the first random access message based on the first identifier of the first UE. For example, SL RA component 254 can generate the random access sequence based on a seed corresponding to the identifier of the UE 104 (e.g., using an m-sequence or Zadoff-Chu sequence). In another example, the one or more parameters received from the base station 102 may include the RA sequence for the UE 104 to use in transmitting RA messages to the second UE, where the RA sequence can be unique to the pair of the first UE 104 and second UE.

In method 400, at Block 406, the first RA message can be transmitted to the second UE as part of the RA procedure over the SL. In an aspect, SL RA component 254, e.g., in conjunction with processor(s) 212, memory 216, transceiver 202, communicating component 242, etc., can transmit, to the second UE, the first RA message as part of the RA procedure over the sidelink. For example, SL RA component 254 can transmit the first RA message based on the RA sequence (e.g., as generated from the identifier of the UE 104 or as received in the one or more parameters from the base station 102). In addition, for example, SL RA component 254 can transmit the first RA message over RA resources defined for SL RA procedures. In one example, the RA resources (e.g., time and/or frequency resources) can be at least partially specified in the one or more parameters received from the base station 102. Moreover, for example, the one or more parameters received from the base station 102 may include a transmit power for the first RA message, one or more transmit beams for the first RA message, etc., and SL RA component 254 can accordingly transmit the first RA message based on the indicated transmit power, one or more transmit beams, etc.

In transmitting the first RA message at Block 406, optionally at Block 408, multiple beams, including the first RA message for each of multiple receive beams associated with the second UE, can be transmitted. In an aspect, SL RA component 254, e.g., in conjunction with processor(s) 212, memory 216, transceiver 202, communicating component 242, etc., can transmit multiple beams including the first RA message for each of the multiple receive beams associated with the second UE. Using beamforming, for example, devices can selectively combine antenna resources (e.g., antenna elements in an antenna array) to achieve a spatial direction for transmitting (or receiving) signals. In this example, devices can select from multiple possible beams and/or can perform a beam sweeping or training procedure to determine a desirable beam to use in transmitting or receiving communications (and/or to determine a desirable beam for another device to use in receiving or transmitting the communications).

In an example, SL RA component 254 can determine the multiple beams based on the one or more parameters received from the base station 102, such as where the base station 102 may know the desirable beams for each UE and/or locations of the UEs with respect to one another such to determine possible beams for one another. In another example, SL RA component 254 can assume the number of receive beams at the second UE to be the same as the number of transmit beams at the first UE. In any case, SL RA component 254 can know a number of receive beams for the second UE, and can transmit each one of its transmit beams for each one of the receive beams for the second UE in a beam sweeping procedure. This can allow the second UE to determine a desirable beam combination of transmit beam of the UE 104 and receive beam of the second UE, as described further herein.

In method 400, at Block 410, a second RA message can be received from the second UE, and in response to transmitting the first RA message, as part of the RA procedure over the SL. In an aspect, SL RA component 254, e.g., in conjunction with processor(s) 212, memory 216, transceiver 202, communicating component 242, etc., can receive, from the second UE and in response to transmitting the first RA message, the second RA message as part of the RA procedure over the sidelink. For example, SL RA component 254 can receive the second random access message over the RA resources related to SL RA procedures (e.g., as received in the one or more parameters from the base station 102 or another configuration, etc.). In another example, SL RA component 254 can determine the resources for receiving the second RA message based on resources used to transmit the first RA message and/or can otherwise explicitly or implicitly indicate the resources for the second RA message in the first RA message, etc. In addition, for example, the second RA message can be based on an identifier of the second UE, where the identifier of the second UE may be received in the one or more parameters from the base station 102.

In method 400, optionally at Block 412, it can be confirmed that the second RA message is from the second UE based on a received identifier associated with the second RA message. In an aspect, SL RA component 254, e.g., in conjunction with processor(s) 212, memory 216, transceiver 202, communicating component 242, etc., can confirm that the second RA message is from the second UE based on the received identifier associated with the second RA message. For example, SL RA component 254 can confirm the second RA message is from the second UE based on determining a RA sequence of the second RA message. For example, as described further herein, the second UE can generate the RA sequence for the second RA message based on an identifier of the second UE, and the SL RA component 254 can verify the same RA sequence based on the identifier of the second UE received in the one or more parameters from the base station 102. In another example, the second UE can generate the RA sequence for the second RA message as an RA sequence received in one or more parameters from the base station 102, which can be the same unique RA sequence received in the one or more parameters by the UE 104 described above. In either case, SL RA component 254 can verify the second RA message as being from the second UE and can accordingly perform subsequent Blocks of method 400 based on the verification or confirmation that the second random access message is from the second UE, as described herein.

In method 400, optionally at Block 414, a beam for transmitting random access messages can be determined. In an aspect, SL RA component 254, e.g., in conjunction with processor(s) 212, memory 216, transceiver 202, communicating component 242, etc., can determine the beam for transmitting the RA messages (e.g., at least a third RA message). For example, SL RA component 254 can determine the beam for transmitting the RA messages based on an indication from the second UE. In an example, the second UE may indicate the transmit beam for the RA messages in transmitting the second RA message. For example, transmission of the second RA message can implicitly indicate the transmit beam to be used by transmitting the second RA message in a certain time occasion, or may explicitly indicate the transmit beam to be used in a parameter of the second RA message, etc. For example, the time occasion may be similar to a time occasion during which the first RA message was transmitted using the desired beam, as described further herein.

In method 400, optionally at Block 416, the third random access message can be transmitted to the second UE and in response to receiving the second random access message. In an aspect, SL RA component 254, e.g., in conjunction with processor(s) 212, memory 216, transceiver 202, communicating component 242, etc., can transmit, to the second UE and in response to receiving the second RA message, the third RA message. As described, SL RA component 254 can transmit the third RA message using the beam determined at Block 414 or a beam determined otherwise (e.g., from the one or more parameters from the base station 102). Moreover, in an example, SL RA component 254 can determine a transmit power for transmitting the third RA message to be at least one of a power used to transmit the first RA message (e.g., as specified in the one or more parameters from the base station 102), a power determined based on a pathloss measurement to the second UE (e.g., computed based on a power of the received second RA message or an indication of pathloss received in the second RA message from the second UE, etc.), and/or the like.

Moreover, for example, SL RA component 254 can transmit the third RA message over sidelink channel resources (e.g., PSCCH/PSSCH resources). In an example, SL RA component 254 can determine the sidelink channel resources based on the RA procedure or in parameters received from the base station (e.g., at Block 402). In another example, SL RA component 254 can determine and/or schedule the resources for the second UE to receive the third RA message, and can accordingly transmit the third RA message in these resources. In addition, as described herein, the third RA message can include an identifier of the UE 104 and/or other control information or data for sidelink communications.

In some examples described herein, transmitting the third RA message can end the RA procedure, and a connection can be considered established between the UEs for communicating with one another over a sidelink channel. For example, where the one or more parameters from the base station 102 include an identifier of the second UE, and the second RA uses a RA sequence based on the identifier of the second UE, the second RA message can be verified, as described, and the SL RA component 254 can transmit the third RA message as an acknowledgement of receiving and verifying the second RA message to end the RA procedure.

In other examples described herein, a fourth RA message can end the RA procedure. For example, where the one or more parameters from the base station 102 include the common RA sequence for the UE pair, SL RA component 254 can transmit the third RA message with a UE identifier of the UE 104, and the second UE can transmit, and the SL RA component 254 can receive, a fourth RA message with the UE identifier of the second UE.

For example, in method 400, optionally at Block 418, a fourth random access message can be received from the second UE and in response to transmitting the third random access message. In an aspect, SL RA component 254, e.g., in conjunction with processor(s) 212, memory 216, transceiver 202, communicating component 242, etc., can receive, from the second UE and in response to transmitting the third RA message, the fourth RA message. In an example, SL RA component 254 can receive the fourth RA message over the sidelink channel resources (e.g., over PSCCH/PSSCH). As described, in this example, the third RA message can include an identifier of the UE 104, and the fourth RA message can include an identifier of the second UE. In addition, as described herein, the fourth RA message can include other control information or data for sidelink communications.

In one example, where the UE 104 is expecting to receive a fourth RA message and does not receive the fourth RA message within a period of time (e.g., where the period of time can be specified in the one or more parameters from the base station 102), in method 400, optionally at Block 420, one or more instances of the third random access message can be retransmitted to the second UE. In an aspect, SL RA component 254, e.g., in conjunction with processor(s) 212, memory 216, transceiver 202, communicating component 242, etc., can retransmit, to the second UE, the one or more instances of the third RA message. For example, SL RA component 254 can retransmit the one or more instances of the third RA message over resources that may be scheduled by the UE 104 for the second UE.

In method 400, optionally at Block 422, a failure report can be transmitted to the base station based at least in part on determining that the fourth random access message is not received from the second UE. In an aspect, failure reporting component 256, e.g., in conjunction with processor(s) 212, memory 216, transceiver 202, communicating component 242, etc., can transmit, to the base station (e.g., base station 102), the failure report based at least in part on determining that the fourth RA message is not received from the second UE. For example, failure reporting component 256 can determine that the fourth RA message is not received from the second UE (or that the second UE otherwise did not receive the third RA message based on transmitting and/or retransmitting a number of instances of the third RA message without receiving the fourth RA message or other acknowledgement for the third RA message.

In this or other examples of method 400, optionally at Block 424, a reconfiguration modifying the one or more parameters can be received from the base station. In an aspect, SL RA requesting component 252, e.g., in conjunction with processor(s) 212, memory 216, transceiver 202, communicating component 242, etc., can receive, from the base station, the reconfiguration modifying the one or more parameters. For example, as described further herein, where the reconfiguration is received due to failure of a RA procedure, the parameters can be modified to indicate different frequency resources for transmitting and/or receiving RA messages, different beams for transmitting and/or receiving the RA messages, different (e.g., increased) transmit power for transmitting the RA messages, etc. In an example, method 400 can again be performed, as described above, based on the modified parameters.

FIG. 5 illustrates a flow chart of an example of a method 500 for performing a SL RA procedure by receiving the first random access message. In an example, a UE (e.g., UE 104-b, as an initially receiving UE in sidelink communications) can perform the functions described in method 500 using one or more of the components described in FIGS. 1 and 2.

In method 500, at Block 502 (e.g., for an initially receiving UE 104-b), one or more parameters for performing a random access procedure with a second UE over a sidelink can be received. In an aspect, SL RA requesting component 252, e.g., in conjunction with processor(s) 212, memory 216, transceiver 202, communicating component 242, etc., can receive, from the base station, the one or more parameters for performing the RA procedure with the second UE over the sidelink. In an example, SL RA requesting component 252 can receive the one or more parameters based on requesting to perform the SL RA procedure with the second UE. In another example, SL RA requesting component 252 can receive the one or more parameters based on the second UE requesting to perform the SL RA procedure with UE 104, etc. In an example, SL RA requesting component 252 can receive the one or more parameters from the base station 102 in radio resource control (RRC) or other higher layer signaling, in downlink control signaling (e.g., over a physical downlink control channel (PDCCH)), etc.

In method 500, at Block 504, the first RA message can be received from the second UE as part of the RA procedure over the SL. In an aspect, SL RA component 254, e.g., in conjunction with processor(s) 212, memory 216, transceiver 202, communicating component 242, etc., can receive, from the second UE, the first RA message as part of the RA procedure over the sidelink. In addition, for example, SL RA component 254 can receive the first RA message over RA resources defined for SL RA procedures. In one example, the RA resources (e.g., time and/or frequency resources) can be at least partially specified in the one or more parameters received from the base station, or may be specified by the first UE over a sidelink channel.

In receiving the first random access message at Block 504, optionally at Block 506, multiple transmit beams from the second UE including the first random access message can be received for each of multiple receive beams. In an aspect, SL RA component 254, e.g., in conjunction with processor(s) 212, memory 216, transceiver 202, communicating component 242, etc., can receive, for each of multiple receive beams, the multiple transmit beams from the second UE including the first RA message. As described above, SL RA component 254 can receive the multiple transmit beams for each of its receive beams as part of a beam sweeping procedure to determine a desirable transmit/receive beam pair for communicating with the second UE. For example, SL RA component 254 can determine which transmit beam received based on which receive beam has the most desirable signal properties. In one example, SL RA component 254 can determine which transmit beam and receive beam combination results in a signal having a highest received signal power or quality (e.g., highest SNR, RSSI, RSRP, RSRQ, etc.). As described further herein, SL RA component 254 can determine to receive communications from the second UE based on the determined receive beam and/or can indicate the transmit beam to the second UE.

In addition, for example, SL RA component 254 can receive the first RA message based on a RA sequence, where the RA sequence can be generated by the second UE based on its own identifier or may be specified in the one or more parameters from the base station 102. In this regard in method 500, optionally at Block 508, it can be confirmed that the first random access message is from the second UE based on a received identifier associated with the first random access message. In an aspect, SL RA component 254, e.g., in conjunction with processor(s) 212, memory 216, transceiver 202, communicating component 242, etc., can confirm that the first random access message is from the second UE based on the received identifier associated with the first random access message. For example, SL RA component 254 can confirm that the first random access message is from the second UE based on determining that the RA sequence is generated using the identifier of the second UE, where the UE 104 can receive the identifier of the second UE in the one or more parameters from the base station 102. In another example, SL RA component 254 can confirm that the first random access message is from the second UE based on determining that the RA sequence matches a sequence indicated in the one or more parameters from the base station 102.

In method 500, optionally at Block 510, a transmit beam to be used for transmitting random access messages can be determined. In an aspect, SL RA component 254, e.g., in conjunction with processor(s) 212, memory 216, transceiver 202, communicating component 242, etc., can determine the transmit beam to be used for transmitting the RA messages. As described above, SL RA component 254 can receive the multiple transmit beams for each of its receive beams as part of a beam sweeping procedure to determine a desirable transmit/receive beam pair for communicating with the second UE, and can determine, based on signal properties thereof, which transmit beam received based on which receive beam (e.g., based on determining which transmit/receive beam pair has a signal with the most desirable properties, such as highest signal strength or quality, at least a threshold signal strength or quality, etc.).

In method 500, optionally at Block 512, a random access sequence for a second random access message can be generated based on a first identifier of a first UE. In an aspect, SL RA component 254, e.g., in conjunction with processor(s) 212, memory 216, transceiver 202, communicating component 242, etc., can generate the random access sequence for the second random access message based on the first identifier of the first UE. For example, SL RA component 254 can generate the random access sequence based on a seed corresponding to the identifier of the UE 104 (e.g., using an m-sequence or Zadoff-Chu sequence). In another example, the one or more parameters received from the base station 102 may include the RA sequence for the UE 104 to use in transmitting RA messages, where the RACH sequence can be unique to the pair of the first UE 104 and second UE.

In method 500, at Block 514, the second RA message can be transmitted to the second UE, in response to receiving the first RA message, as part of the RA procedure over the SL. In an aspect, SL RA component 254, e.g., in conjunction with processor(s) 212, memory 216, transceiver 202, communicating component 242, etc., can transmit, to the second UE and in response to receiving the first RA message, the second RA message as part of the RA procedure over the sidelink. For example, SL RA component 254 can transmit the second RA message based on the RA sequence (e.g., as generated from the identifier of the UE 104 or as received in the one or more parameters from the base station 102). In addition, for example, SL RA component 254 can transmit the second RA message over RA resources defined for SL RA procedures, where SL RA component 254 can determine the resources from one or more parameters received from the base station, or as indicated or determined from resources over which the first RA message is received, etc. In one example, the RA resources (e.g., time and/or frequency resources) can be at least partially specified in the one or more parameters received from the base station. Moreover, for example, the one or more parameters received from the base station 102 may include a transmit power to be used for transmitting the second RA message, one or more transmit beams to be used for transmitting the second RA message, etc., and SL RA component 254 can accordingly transmit the second RA message based on the indicated transmit power, one or more transmit beams, etc.

In another example, as described herein, SL RA component 254 can transmit the second RA message based on the determined receive and/or transmit beam (and/or to indicate the desired transmit beam for the second UE). In one example, SL RA component 254 can use a transmit beam that is reciprocal to the determined receive beam to transmit the second RA message. In addition, for example, SL RA component 254 can indicate the desired transmit beam in the transmission of the second RA message (e.g., as an explicit or implicit indication). In one specific example, SL RA component 254 can implicitly indicate the desired transmit beam, which can include transmitting the second RA message in a time occasion that corresponds to the time occasion over which the first RA message was received from the second UE based on the desired transmit beam, as described further herein.

In addition, SL RA component 254 can transmit the second RA message with power control (e.g., based on a power control command received from the second UE) and/or using power ramping such that SL RA component 254 can transmit the second RA message at multiple instances each with increasing power. In this example, SL RA component 254 can continue transmitting the second RA message until it is received (e.g., until a third RA message is received acknowledging the second RA message) and/or for a maximum number of attempts after which failure can be determined, as described herein.

In method 500, optionally at Block 518, the third random access message can be received from the second UE and in response to transmitting the second random access message. In an aspect, SL RA component 254, e.g., in conjunction with processor(s) 212, memory 216, transceiver 202, communicating component 242, etc., can receive, from the second UE and in response to transmitting the second RA message, the third RA message. For example, SL RA component 254 can receive the third RA message over sidelink channel resources (e.g., PSCCH/PSSCH, as described). The third RA message may serve as an acknowledgement that the second UE received the second RA message from UE 104, and in some cases, may end the RA procedure, after which the UEs can communicate over sidelink resources. The third RA message may also include other control or data information, as described herein. In some examples described herein, receiving the third RA message can end the RA procedure, and a connection can be considered established between the UEs for communicating with one another over a sidelink channel.

In another example, the third RA message can include an identifier of the second UE to allow the UE 104 to verify communications with the second UE. In this example, in method 500, optionally at Block 520, a fourth random access message can be transmitted to the second UE and in response to receiving the third random access message. In an aspect, SL RA component 254, e.g., in conjunction with processor(s) 212, memory 216, transceiver 202, communicating component 242, etc., can transmit, to the second UE an in response to receiving the third RA message, a fourth RA message. For example, the fourth RA message can include an identifier of the UE 104 to allow the second UE to verify communications with the UE 104. In an example, transmitting the fourth RA message may end the RA procedure, after which the UEs can communicate over sidelink resources. In addition, for example, SL RA component 254 can transmit the fourth RA message using power ramping, as described above, and/or using the same power used to transmit the second RA message, etc. The fourth RA message may also include other control or data information, as described herein.

In an example, in method 500, optionally at Block 522, a failure report can be transmitted to the base station based at least in part on determining that the third RA message is not received from the second UE. In an aspect, failure reporting component 256, e.g., in conjunction with processor(s) 212, memory 216, transceiver 202, communicating component 242, etc., can transmit, to the base station (e.g., base station 102), the failure report based at least in part on determining that the third RA message is not received from the second UE. For example, failure reporting component 256 can determine that the third RA message is not received from the second UE (or that the second UE otherwise did not receive the second RA message) based on transmitting and/or retransmitting a number of instances of the second RA message (e.g., based on power ramping) without receiving the third RA message or other acknowledgement for the second RA message from the second UE.

In this or other examples of method 500, optionally at Block 524, a reconfiguration modifying the one or more parameters can be received from the base station. In an aspect, SL RA requesting component 252, e.g., in conjunction with processor(s) 212, memory 216, transceiver 202, communicating component 242, etc., can receive, from the base station, the reconfiguration modifying the one or more parameters. For example, as described further herein, where the reconfiguration is received due to failure of a RA procedure, the parameters can be modified to indicate different frequency resources for transmitting and/or receiving RA messages, different beams for transmitting and/or receiving the RA messages, different (e.g., increased) transmit power for transmitting the RA messages, etc. In an example, method 500 can again be performed, as described above, based on the modified parameters.

FIG. 6 illustrates a flow chart of an example of a method 600 for configuring UEs to perform RA procedures over a sidelink. In an example, a base station (e.g., base station 102 or other network component) can perform the functions described in method 600 using one or more of the components described in FIGS. 1 and 3.

In method 600, at Block 602, a request can be received, from a first UE, to perform a random access procedure with a second UE over a sidelink. In an aspect, SL RA configuring component 352, e.g., in conjunction with processor(s) 312, memory 316, transceiver 302, configuring component 342, etc., can receive, from the first UE, the request to perform the RA procedure with the second UE over the SL. For example, SL RA configuring component 352 can receive the request from the first UE over a Uu interface therewith and/or over corresponding uplink resources. In another example, SL RA configuring component 352 may additionally or alternatively receive a request from the second UE to perform the RA procedure with the first UE. In any case, in an example, the base station 102 may serve both UEs over the Uu interface or may otherwise be configured to communicate with another base station that serves one or more of the UEs to provide parameters to facilitate RA procedure between the UEs.

In method 600, at Block 604, one or more parameters can be generated for the first UE to perform the random access procedure with the second UE over the sidelink. In an aspect, SL RA configuring component 352, e.g., in conjunction with processor(s) 312, memory 316, transceiver 302, configuring component 342, etc., can generate the one or more parameters for the first UE to perform the random access procedure with the second UE over the sidelink. For example, SL RA configuring component 352 can generate the one or more parameters to include frequency resources for the RA procedure, time resources for the RA procedure, beams to use in transmitting and/or receiving RA messages, etc.

In an example, SL RA configuring component 352 can generate the one or more parameters to include frequency resources where narrowband with frequency hopping may be indicated, wideband may be indicated, etc. to provide a desired level of frequency diversity. In an example, the frequency resources can be indicated or considered to be the same for the first and second RA messages described above (e.g., which can make good use of channel reciprocity (assuming time division duplexing)), though the one or more parameters may include different frequency resources for the first and second RA messages in some examples.

In an example, SL RA configuring component 352 can generate the one or more parameters to include time resources, which can include starting time, time slot/occasion, maximum number of power ramping (e.g., for the second RA message described above), timer durations for waiting for the third or fourth RA message, as described above, before determining failure, etc.

In an example, SL RA configuring component 352 can generate the one or more parameters to include beam related information for beam sweeping, such as which beam level(s) to use (e.g., broad or narrow, as described above), number of beams per configured level, and/or an ordering of the levels (if more than one beam level is configured) or beams within each level, etc. In an example, SL RA configuring component 352 can determine beams for the first and/or second UE based on beams used in communicating therewith by the base station 102, based on a location of the UEs or relative distance between the UEs (or relative distance between the first UE and base station 102 along with relative distance between the second UE and base station 102), etc. In addition, for example, SL RA configuring component 352 can configure the one or more parameters to be the same or different for the first and second UE. In any case, for example, SL RA configuring component 352 can transmit the one or more parameters to both UEs so that two UEs can coordinate beam sweeping.

In an example, SL RA configuring component 352 can generate the one or more parameters to include a transmit power for one or more RA message, such as a fixed transmit power for at least the first RA message described above. For example, SL RA configuring component 352 may select the fixed transmit power from several choices (e.g., high, medium, low), depending on some prior info (if any), such as, the relative location of the first and second UEs (e.g., low power if the first and second UEs are close in location), etc. For example, SL RA configuring component 352 can select the transmit power to be conservative so that the first RA message can be received successfully with high probability. In an example, fixing the transmit power for the first RA message can facilitate pathloss (PL) calculation, which can be used for the power control of the second and/or fourth RA messages and/or for PSCCH/PSSCH communications.

In an example, SL RA configuring component 352 can generate the one or more parameters to include an identifier of the first UE (e.g., for the second UE), an identifier of the second UE (e.g., for the first UE), an RA sequence that is unique to the first and second UEs, etc. As described above, in one example, SL RA configuring component 352 may generate the RA sequences for the UEs based on parameters of the UEs (e.g., seeds corresponding to identifiers of the UEs, etc.). These parameters can allow the UEs to verify communications with one another. In an example, the identifiers can be similar to or can include a radio network temporary identifier (RNIT) of the UEs, etc.

In method 600, at Block 606, the one or more parameters can be transmitted to the first UE and/or the second UE. In an aspect, SL RA configuring component 352, e.g., in conjunction with processor(s) 312, memory 316, transceiver 302, configuring component 342, etc., can transmit the one or more parameters to the first UE and/or the second UE, which can be in response to the request received at Block 602 or otherwise. The UEs may accordingly attempt to perform the RA procedure with one another, which may be based on the parameters, as described above.

In method 600, optionally at Block 608, a failure report related to the random access procedure can be received from the first UE or the second UE. In an aspect, SL RA configuring component 352, e.g., in conjunction with processor(s) 312, memory 316, transceiver 302, configuring component 342, etc., can receive, from the first UE or the second UE, the failure report related to the random access procedure. As described, the failure report may be related to one UE not receiving one of the random access messages in the random access procedure from the other UE.

In method 600, optionally at Block 610, the one or more parameters for performing the random access procedure can be modified based on the failure report. In an aspect, SL RA configuring component 352, e.g., in conjunction with processor(s) 312, memory 316, transceiver 302, configuring component 342, etc., can modify, based on the failure report, the one or more parameters for performing the random access procedure. For example, SL RA configuring component 352 can modify a parameter to increase a transmit power for the first RA message for a subsequent RA procedure attempt, configure a higher beam level (if not used) for a subsequent RA procedure attempt, etc.

In method 600, optionally at Block 612, the one or more parameters, as modified, can be transmitted to the first UE and/or the second UE. In an aspect, SL RA configuring component 352, e.g., in conjunction with processor(s) 312, memory 316, transceiver 302, configuring component 342, etc., can transmit the one or more parameters, as modified, to the first UE and/or the second UE. In this regard, the first UE and/or the second UE can retry the RA procedure based on the modified parameters, as described above.

In another example, in method 600, optionally at Block 614, a relay functionality for communications between the first UE and the second UE can be configured. In an aspect, SL RA configuring component 352, e.g., in conjunction with processor(s) 312, memory 316, transceiver 302, configuring component 342, etc., can configure a relay functionality for communications between the first UE and the second UE, which may be based on receiving the failure report. For example, SL RA configuring component 352 can configure the relay functionality in the base station 102 such that the first UE and second UE can communicate via the base station 102. In another example, SL RA configuring component 352 can configure the relay functionality in a different UE such that the first UE and second UE can communicate via the different UE. In an example, SL RA configuring component 352 can configure a relay functionality (e.g., at Block 614) based on modifying and transmitting the one or more parameters (e.g., at Blocks 610, 612) a maximum number of times, where the maximum number may be greater than or equal to zero. In another example, SL RA configuring component 352 can configure a relay functionality (e.g., at Block 614) based on receiving a certain number of failure reports from the UE(s) (e.g., at Block 608).

Figure 7:
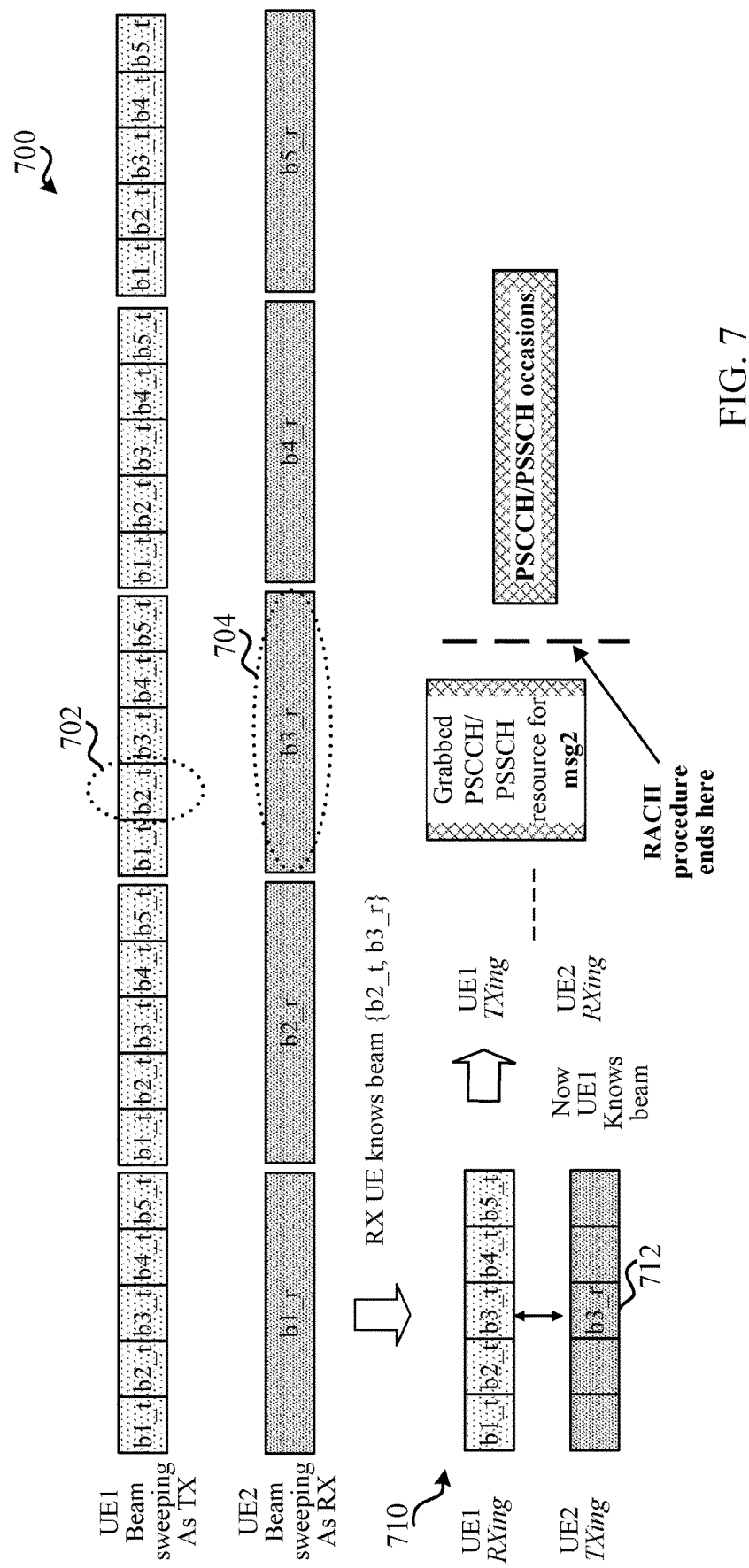
FIG. 7 illustrates an example of a beam sweeping procedure for a SL RA procedure with three messages, in accordance with various aspects of the present disclosure.

FIG. 7 illustrates an example of a beam sweeping procedure 700 performed by a first UE and a second UE. In beam sweeping procedure 700, the first UE (UE1) transmits five transmit beams (b1_t, b2_t, b3_t, b4_t, b5_t) for each of five receive beams (b1_r, b2_r, b3_r, b4_r, b5_r) of the second UE (UE2). For example, UE1 can transmit the first RA message (msg0) using this beam sweeping procedure, as described. Based on this, UE2 can determine a desirable beam pair of transmit beam b2_t 702 and receive beam b3_r 704 (e.g., based on determining that transmit beam b2_t received using receive beam b3_r resulted in a signal with the highest signal power or quality compared to other beam pairs). At beam indicating procedure 710, UE2 can transmit the second RA message (msg1) using a reciprocal beam for b3_r and can transmit the second RA message in a time occasion 712 corresponding to transmit beam b2_t to implicitly indicate to UE1, based on the time occasion, to use the transmit beam b2_t in transmitting subsequent messages (e.g., a third RA message and/or other RA messages) to UE2. In this example, UE2 can perform power ramping for the second RA message (msg1) if the third RA message (msg2) is not received within certain timer.

Figure 8:
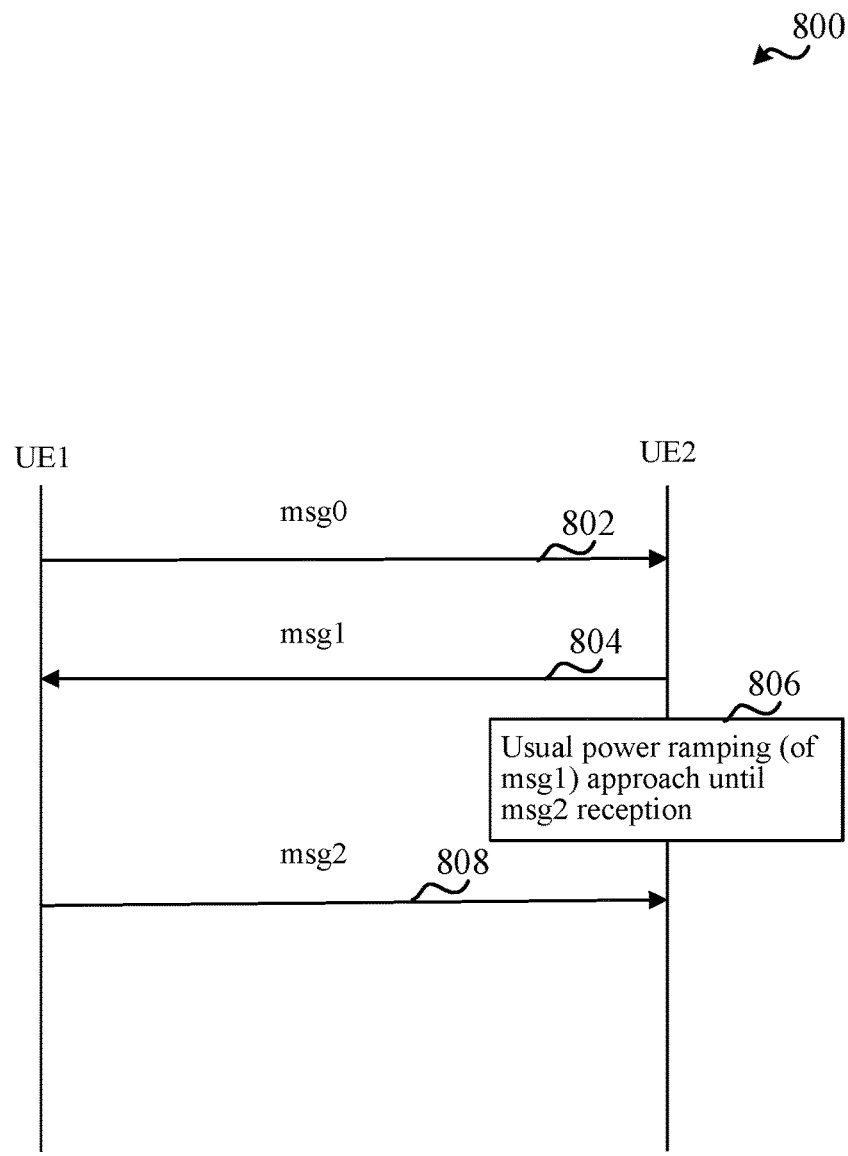
FIG. 8 illustrates an example of a system for performing a SL RA procedure with three messages, in accordance with various aspects of the present disclosure.

FIG. 8 illustrates an example of a system 800 for performing a RA procedure with three RA messages in accordance with aspects described herein. In this example, UE1 transmits a first RA message (msg0) 802 to UE2, UE2 transmits a second RA message (msg1) 804 to UE1, which can be transmitted using power ramping 806 until a third RA message (msg2) 808 is received from UE1.

Figure 9:
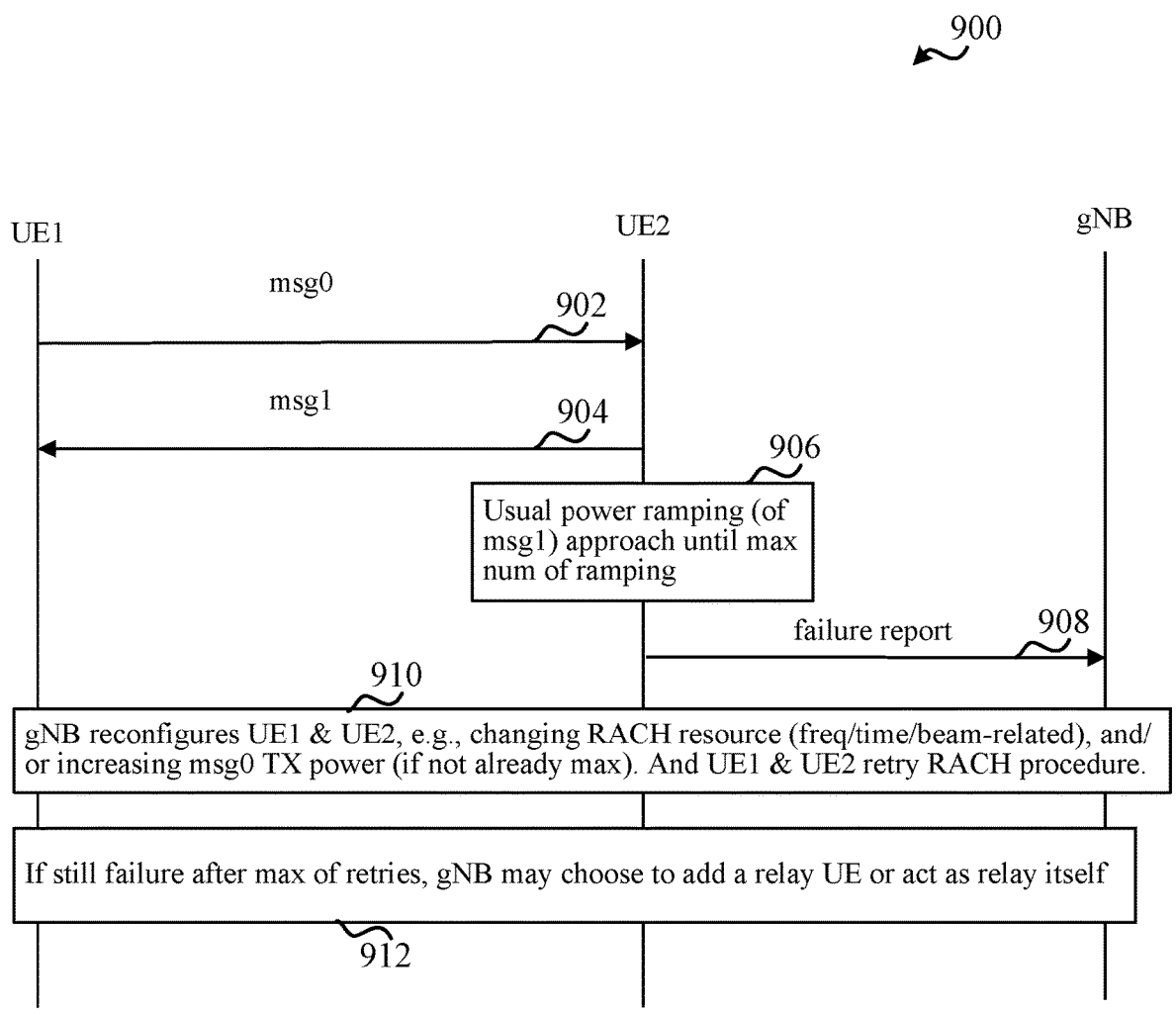
FIG. 9 illustrates an example of a system for performing a SL RA procedure with three messages with failure indication, in accordance with various aspects of the present disclosure.

FIG. 9 illustrates an example of a system 900 for performing a RA procedure with three RA messages with failure reporting in accordance with aspects described herein. In this example, UE1 transmits a first RA message (msg0) 902 to UE2, UE2 transmits a second RA message (msg1) 904 to UE1, which can be transmitted using power ramping 906 until a third RA message (msg2) is received from UE1. However, the third RA message may not be received from UE1, in which case UE2 can report failure 908 to the base station (gNB). In this example, the gNB can reconfigure UE1 and/or UE2 with different parameters for the RA procedure, and the UEs can again attempt to perform the RA procedure 910. In another example (e.g., after a maximum number of RA procedure attempts), the base station can add a UE relay for the UEs or serve as the relay for the UEs to facilitate communication between the UEs 912.

Figure 10:
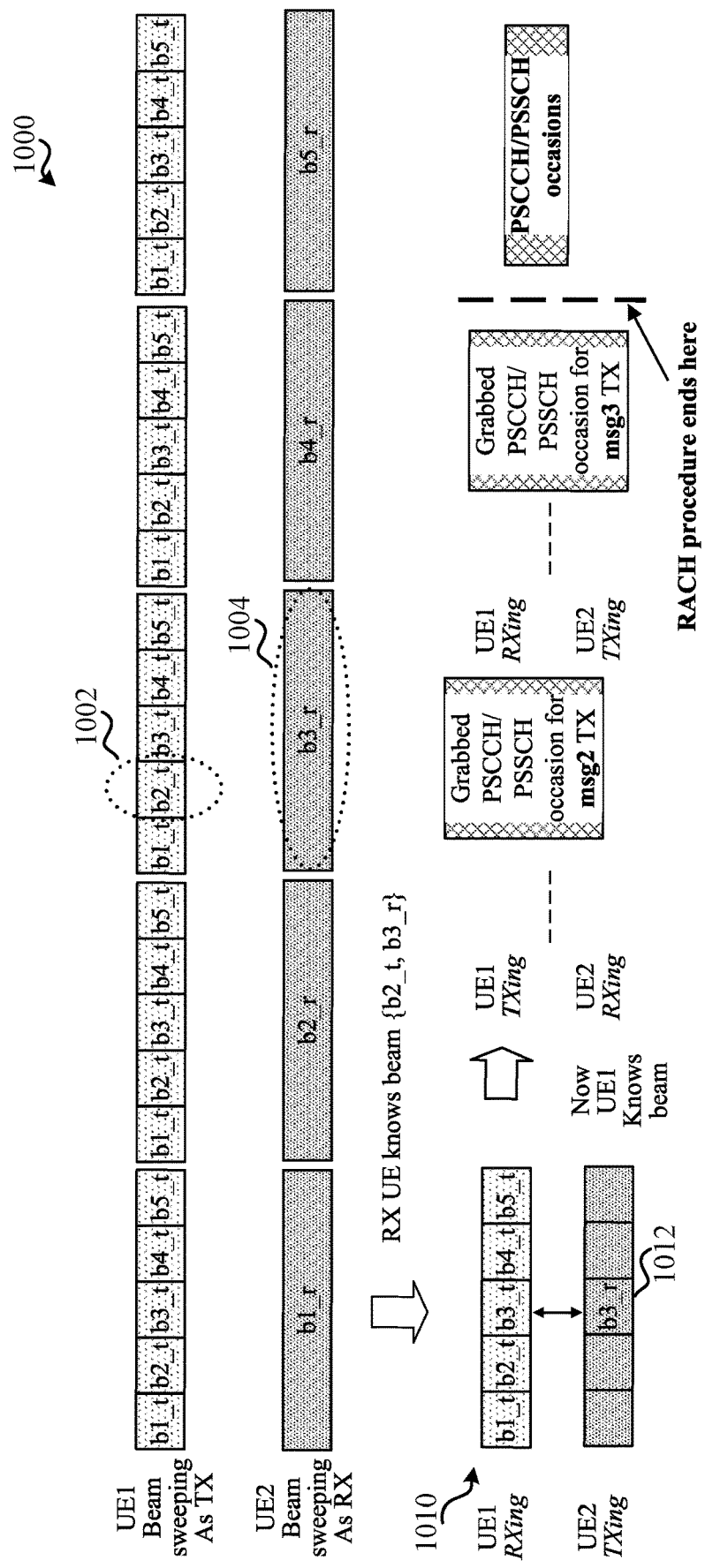
FIG. 10 illustrates an example of a beam sweeping procedure for a SL RA procedure with four messages, in accordance with various aspects of the present disclosure.

FIG. 10 illustrates an example of a beam sweeping procedure 1000 performed by a first UE and a second UE. In beam sweeping procedure 1000, the first UE (UE1) transmits five transmit beams (b1_t, b2_t, b3_t, b4_t, b5_t) for each of five receive beams (b1_r, b2_r, b3_r, b4_r, b5_r) of the second UE (UE2). For example, UE1 can transmit the first RA message (msg0) using this beam sweeping procedure, as described. Based on this, UE2 can determine a desirable beam pair of transmit beam b2_t 1002 and receive beam b3_r 1004. At beam indicating procedure 1010, UE2 can transmit the second RA message (msg1) using a reciprocal beam for b3_r and can transmit the second RA message in a time occasion 1012 corresponding to transmit beam b2_t to implicitly indicate to UE1, based on the time occasion, to use the transmit beam b2_t in transmitting subsequent messages (e.g., a third RA message and/or other RA messages) to UE2. In this example, UE2 can perform power ramping for the second RA message (msg1) if the third RA message (msg2) is not received within a certain time. In addition, for example, UE1 can perform retransmission of the third RA message (msg2) if the fourth RA message (msg3) is not received within the certain time.

Figure 11:
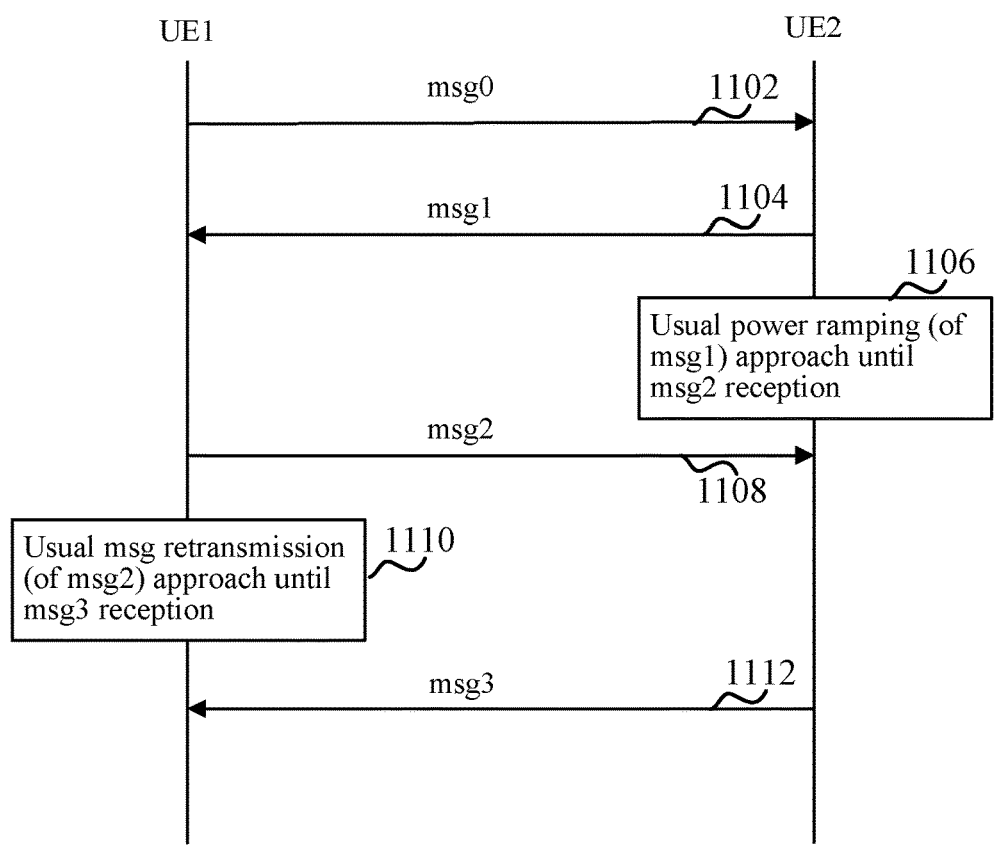
FIG. 11 illustrates an example of a system for performing a SL RA procedure with four messages, in accordance with various aspects of the present disclosure.

FIG. 11 illustrates an example of a system 1100 for performing a RA procedure with four RA messages in accordance with aspects described herein. In this example, UE1 transmits a first RA message (msg0) 1102 to UE2, UE2 transmits a second RA message (msg1) 1104 to UE1, which can be transmitted using power ramping 1106 until a third RA message (msg2) 1108 is received from UE1. In addition, for example, UE1 can transmit or retransmit the third RA message (msg2) 1110 until a fourth RA message (msg3) 1112 is received from UE2.

Figure 12:
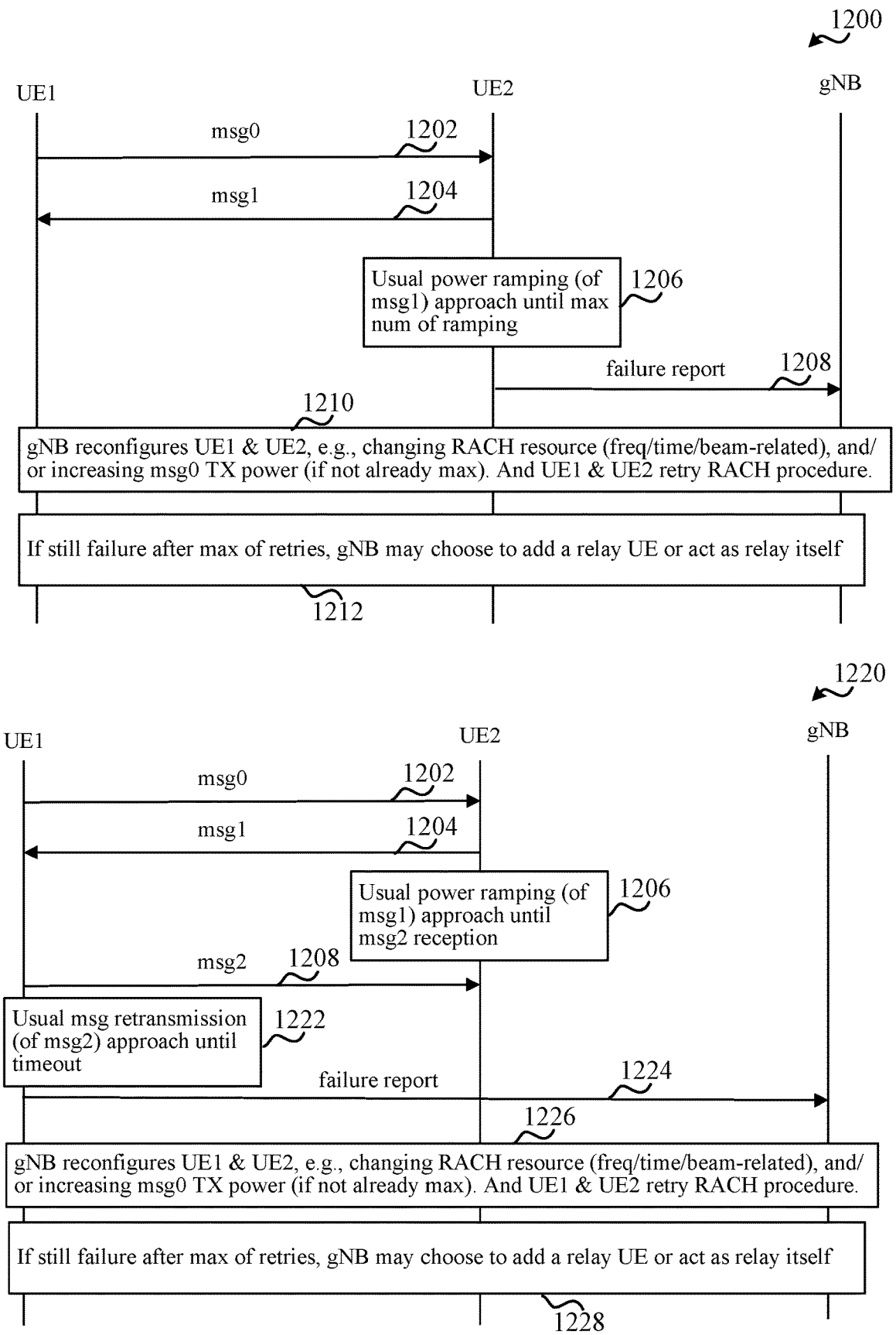
FIG. 12 illustrates examples of systems for performing a SL RA procedure with four messages with failure indication, in accordance with various aspects of the present disclosure.

FIG. 12 illustrates an example of a systems 1200, 1220 for performing a RA procedure with four RA messages with failure reporting in accordance with aspects described herein. In system 1200, for example, UE1 transmits a first RA message (msg0) 1202 to UE2, UE2 transmits a second RA message (msg1) 1204 to UE1, which can be transmitted using power ramping 1206 until a third RA message (msg2) is received from UE1. However, the third RA message may not be received from UE1, in which case UE2 can report failure 1208 to the base station (gNB). In this example, the gNB can reconfigure UE1 and/or UE2 with different parameters for the RA procedure, and the UEs can again attempt to perform the RA procedure 1210. In another example (e.g., after a maximum number of RA procedure attempts), the base station can add a UE relay for the UEs or serve as the relay for the UEs to facilitate communication between the UEs 1212.

In another example, in system 1220, msg2 can be received 1208 by UE2 and UE2 can attempt to transmit the fourth RA message (msg3) 1222 to the UE1, but the fourth RA message may not be received from UE2, in which case UE1 can report failure 1224 to the base station (gNB). In this example, the gNB can reconfigure UE1 and/or UE2 with different parameters for the RA procedure, and the UEs can again attempt to perform the RA procedure 1226. In another example (e.g., after a maximum number of RA procedure attempts), the base station can add a UE relay for the UEs or serve as the relay for the UEs to facilitate communication between the UEs 1228.

Figure 13:
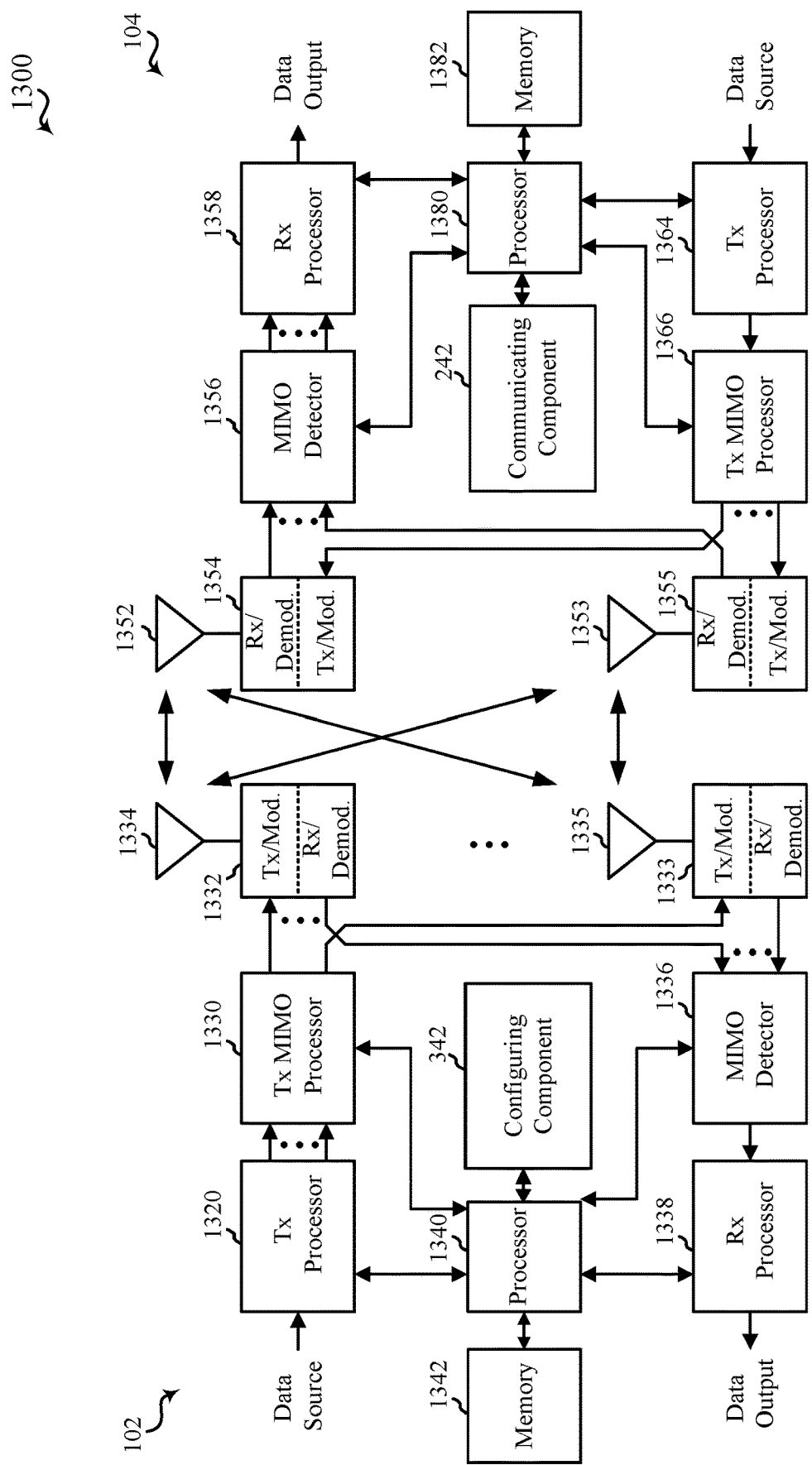
FIG. 13 is a block diagram illustrating an example of a MIMO communication system including a base station and a UE, in accordance with various aspects of the present disclosure.

FIG. 13 is a block diagram of a MIMO communication system 1300 including a base station 102 and a UE 104, in accordance with various aspects of the present disclosure. The MIMO communication system 1300 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 1334 and 1335, and the UE 104 may be equipped with antennas 1352 and 1353. In the MIMO communication system 1300, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1320 may receive data from a data source. The transmit processor 1320 may process the data. The transmit processor 1320 may also generate control symbols or reference symbols. A transmit MIMO processor 1330 may perform spatial processing (e.g., precoding) on data symbols, control symbols, or reference symbols, if applicable, and may provide output symbol streams to the transmit modulator/demodulators 1332 and 1333. Each modulator/demodulator 1332 through 1333 may process a respective output symbol stream (e.g., for OFDM, etc.) to obtain an output sample stream. Each modulator/demodulator 1332 through 1333 may further process (e.g., convert to analog, amplify, filter, and upconvert) the output sample stream to obtain a DL signal. In one example, DL signals from modulator/demodulators 1332 and 1333 may be transmitted via the antennas 1334 and 1335, respectively.

The UE 104 may be an example of aspects of the UEs 104 described with reference to FIGS. 1-2. At the UE 104, the UE antennas 1352 and 1353 may receive the DL signals from the base station 102 and may provide the received signals to the modulator/demodulators 1354 and 1355, respectively. Each modulator/demodulator 1354 through 1355 may condition (e.g., filter, amplify, downconvert, and digitize) a respective received signal to obtain input samples. Each modulator/demodulator 1354 through 1355 may further process the input samples (e.g., for OFDM, etc.) to obtain received symbols. A MIMO detector 1356 may obtain received symbols from the modulator/demodulators 1354 and 1355, perform MIMO detection on the received symbols, if applicable, and provide detected symbols. A receive (Rx) processor 1358 may process (e.g., demodulate, deinterleave, and decode) the detected symbols, providing decoded data for the UE 104 to a data output, and provide decoded control information to a processor 1380, or memory 1382.

The processor 1380 may in some cases execute stored instructions to instantiate a communicating component 242 (see e.g., FIGS. 1 and 2).

On the uplink (UL), at the UE 104, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the modulator/demodulators 1354 and 1355 (e.g., for SC-FDMA, etc.), and be transmitted to the base station 102 in accordance with the communication parameters received from the base station 102. At the base station 102, the UL signals from the UE 104 may be received by the antennas 1334 and 1335, processed by the modulator/demodulators 1332 and 1333, detected by a MIMO detector 1336 if applicable, and further processed by a receive processor 1338. The receive processor 1338 may provide decoded data to a data output and to the processor 1340 or memory 1342.

The processor 1340 may in some cases execute stored instructions to instantiate a configuring component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 1300. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1300.

The following aspects are illustrative only and aspects thereof may be combined with aspects of other embodiments or teaching described herein, without limitation.

Aspect 1 is a method for wireless communications by a first UE including receiving, from a base station, one or more parameters for performing a random access procedure with a second UE over a sidelink, transmitting, to the second UE, a first random access message as part of the random access procedure over the sidelink, and receiving, from the second UE and in response to transmitting the first random access message, a second random access message as part of the random access procedure over the sidelink, wherein at least one of transmitting the first random access message or receiving the second random access message are based on the one or more parameters.

In Aspect 2, the method of Aspect 1 includes generating a random access sequence for the first random access message based on an identifier of the first UE, and transmitting the first random access message at a fixed power.

In Aspect 3, the method of any of Aspects 1 or 2 includes wherein the one or more parameters include a second identifier of the second UE, and confirming that the second random access message is from the second UE based at least in part on comparing a received identifier in the second random access message to the second identifier of the one or more parameters.

In Aspect 4, the method of Aspect 3 includes determining the received identifier based on a random access sequence associated with the second random access message.

In Aspect 5, the method of any of Aspects 3 or 4 includes transmitting, to the second UE and in response to receiving the second random access message, a third random access message acknowledging receipt of the second random access message as part of the random access procedure.

In Aspect 6, the method of Aspect 5 includes determining, based on a time occasion during which the second random access message is received, a beam for transmitting a third random access message.

In Aspect 7, the method of Aspect 6 includes wherein transmitting the third random access message comprises transmitting the third random access message at a same fixed power as the first random access message or at a power calculated based on at least one of a determined pathloss or a configured setting.

In Aspect 8, the method of any of Aspects 1 to 7 includes wherein the one or more parameters include a random access sequence to use in transmitting the first random access message, and wherein transmitting the first random access message comprises transmitting the first random access message at a fixed power.

In Aspect 9, the method of Aspect 8 includes transmitting, to the second UE and in response to receiving the second random access message, a third random access message including an identifier of the first UE as part of the random access procedure.

In Aspect 10, the method of Aspect 9 includes receiving, from the second UE and in response to transmitting the third random access message, a fourth random access message including an identifier of the second UE as part of the random access procedure.

In Aspect 11, the method of any of Aspects 9 or 10 includes retransmitting, to the second UE, one or more instances of the third random access message.

In Aspect 12, the method of Aspect 11 includes transmitting, to the base station, a failure report based at least in part on determining, based on transmitting the third random access message and retransmitting the one or more instances of the third random access message to the second UE, that the second UE did not receive the third random access message.

In Aspect 13, the method of Aspect 12 includes receiving, from the base station and in response to the failure report, one or more modified parameters for retrying the random access procedure with the second UE.

In Aspect 14, the method of any of Aspects 8 to 13 includes determining, based on a time occasion during which the second random access message is received, a beam for transmitting a third random access message.

In Aspect 15, the method of Aspect 14 includes wherein transmitting the third random access message comprises transmitting the third random access message at a same fixed power as the first random access message or at a power calculated based on at least one of a determined pathloss or a configured setting.

In Aspect 16, the method of any of Aspects 1 to 15 includes wherein transmitting the first random access message comprises transmitting multiple transmit beams including the first random access message for each of multiple receive beams associated with the second UE.

In Aspect 17, the method of any of Aspects 1 to 16 includes wherein the one or more parameters include one or more of an indication of time or frequency resources over which to at least one of transmit the first random access message or receive the second random access message, or an indication of one or more beams to use to at least one of transmit the first random access message or receive the second random access message.

In Aspect 18, the method of Aspect 17 includes receiving, from the base station, a reconfiguration to transmit the first random access message at a different fixed power and using one or more different random access resources, and transmitting, to the second UE, the first random access message as part of the reconfiguration to retry the random access procedure with the second UE.

Aspect 19 is a method for wireless communications by a first UE including receiving, from a base station, one or more parameters for performing a random access procedure with a second UE over a sidelink, receiving, from the second UE, a first random access message as part of the random access procedure over the sidelink, and transmitting, to the second UE and in response to receiving the first random access message, a second random access message as part of the random access procedure over the sidelink, wherein at least one of receiving the first random access message or transmitting the second random access message are based on the one or more parameters.

In Aspect 20, the method of Aspect 19 includes wherein the one or more parameters include an identifier of the second UE, and confirming that the first random access message is from the second UE based at least in part on comparing a received identifier in the first random access message to the identifier of the one or more parameters.

In Aspect 21, the method of Aspect 20 includes determining the received identifier based on a random access sequence associated with the first random access message.

In Aspect 22, the method of any of Aspects 20 or 21 includes receiving, from the second UE and in response to transmitting the second random access message, a third random access message acknowledging receipt of the second random access message as part of the random access procedure.

In Aspect 23, the method of any of Aspects 19 to 22 includes generating a random access sequence for the second random access message based on an identifier of the first UE, and transmitting the second random access message at a power calculated based on at least one of a determined pathloss or a configured setting.

In Aspect 24, the method of any of Aspects 19 to 23 includes wherein the one or more parameters include a random access sequence to use in transmitting the second random access message.

In Aspect 25, the method of Aspect 24 includes receiving, from the second UE and in response to transmitting the second random access message, a third random access message including an identifier of the second UE as part of the random access procedure.

In Aspect 26, the method of Aspect 25 includes transmitting, to the second UE and in response to receiving the third random access message, a fourth random access message including an identifier of the first UE as part of the random access procedure.

In Aspect 27, the method of Aspect 26 includes determining a transmit power for transmitting the fourth random access message as at least one of a same transmit power used to transmit the second random access message or a power based on at least one of a determined PL or a configured setting.

In Aspect 28, the method of any of Aspects 19 to 27 includes wherein receiving the first random access message comprises receiving, for each of multiple receive beams, multiple transmit beams from the second UE including the first random access message, and further comprising determining a transmit beam and receive beam combination for the random access procedure, wherein transmitting the second random access message includes indicating the transmit beam to the second UE.

In Aspect 29, the method of Aspect 28 includes wherein indicating the transmit beam comprises transmitting the second random access message in a time occasion to indicate the transmit beam.

In Aspect 30, the method of any of Aspects 19 to 29 includes retransmitting, to the second UE, one or more instances of the second random access message using power ramping.

In Aspect 31, the method of Aspect 30 includes transmitting, to the base station, a failure report based at least in part on determining, based on transmitting the second random access message and retransmitting the one or more instances of the second random access message to the second UE, that the second UE did not receive the second random access message.

In Aspect 32, the method of Aspect 31 includes receiving, from the base station and in response to the failure report, one or more modified parameters for retrying the random access procedure with the second UE.

In Aspect 33, the method of any of Aspects 19 to 32 includes wherein the one or more parameters include one or more of an indication of time or frequency resources over which to at least one of receive the first random access message or transmit the second random access message, or an indication of one or more beams to use to at least one of receive the first random access message or transmit the second random access message.

Aspect 34 is a method for wireless communications by a base station including receiving, from a first UE, a request to perform a random access procedure with a second UE over a sidelink, generating one or more parameters for the first UE to perform the random access procedure with the second UE over the sidelink, and transmitting the one or more parameters to the first UE and the second UE.

In Aspect 35, the method of Aspect 34 includes wherein the one or more parameters include at least one of an identifier of the first UE or an identifier of the second UE.

In Aspect 36, the method of any of Aspects 34 or 35 includes wherein the one or more parameters include at least one of a random access sequence for the first UE or a second random access sequence for the second UE.

In Aspect 37, the method of any of Aspects 34 to 36 includes wherein the one or more parameters include one or more of an indication of time or frequency resources for a first random access message, or an indication of one or more beams for the first random access message.

In Aspect 38, the method of any of Aspects 34 to 37 includes wherein the one or more parameters include a transmit power for transmitting a first random access message.

In Aspect 39, the method of any of Aspects 34 to 38 includes receiving, from the first UE or the second UE, a failure report related to the random access procedure, modifying, based on the failure report, the one or more parameters for performing the random access procedure, and transmitting the one or more parameters, as modified, to the first UE and the second UE.

In Aspect 40, the method of Aspect 39 includes wherein modifying the one or more parameters includes increasing a transmit power for at least one of a first random access message or a third random access message for the first UE.

In Aspect 41, the method of any of Aspects 39 or 40 includes wherein modifying the one or more parameters includes indicating narrower beams for at least one of the first UE or the second UE to use in transmitting or receiving random access messages.

In Aspect 42, the method of any of Aspects 39 to 41 includes wherein modifying the one or more parameters includes indicating different frequency resource for at least one of the first UE or the second UE to use in transmitting or receiving random access messages.

In Aspect 43, the method of any of Aspects 34 to 42 includes wherein generating the one or more parameters is based at least in part on determining a location of the first UE and the second UE or determining a relative distance between the first UE and the second UE.

Aspect 44 is an apparatus for wireless communication including a transceiver, a memory configured to store instructions, and one or more processors communicatively coupled with the transceiver and the memory, wherein the one or more processors are configured to execute the instructions to perform the operations of one or more methods in any of Aspects 1 to 43.

Aspect 45 is an apparatus for wireless communication including means for performing the operations of one or more methods in any of Aspects 1 to 43.

Aspect 46 is a computer-readable medium including code executable by one or more processors to perform the operations of one or more methods in any of Aspects 1 to 43.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or"

as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications by a first user equipment (UE), comprising:
   receiving, from a base station, one or more parameters for performing a random access procedure with a second UE over a sidelink;
   generating a random access sequence based on an identifier of the first UE;
   transmitting, to the second UE and based on the random access sequence, a first random access message as part of the random access procedure over the sidelink; and
   receiving, from the second UE and in response to transmitting the first random access message, a second random access message as part of the random access procedure over the sidelink, wherein at least one of transmitting the first random access message or receiving the second random access message are based on the one or more parameters.

2. The method of claim 1, wherein transmitting the first random access message is at a fixed power.

3. The method of claim 1, wherein the one or more parameters include a second identifier of the second UE, and further comprising confirming that the second random access message is from the second UE based at least in part on comparing a received identifier in the second random access message to the second identifier of the one or more parameters.

4. The method of claim 3, further comprising determining the received identifier based on a second random access sequence associated with the second random access message.

5. The method of claim 3, further comprising transmitting, to the second UE and in response to receiving the second random access message, a third random access message acknowledging receipt of the second random access message as part of the random access procedure.

6. The method of claim 5, further comprising determining, based on a time occasion during which the second random access message is received, a beam for transmitting a third random access message.

7. The method of claim 1, further comprising transmitting, to the second UE and in response to receiving the second random access message, a third random access message including an identifier of the first UE as part of the random access procedure.

8. The method of claim 7, further comprising transmitting, to the base station, a failure report based at least in part on determining, based on transmitting the third random access message and retransmitting one or more instances of the third random access message to the second UE, that the second UE did not receive the third random access message.

9. The method of claim 8, further comprising receiving, from the base station and in response to the failure report, one or more modified parameters for retrying the random access procedure with the second UE.

10. The method of claim 1, wherein transmitting the first random access message comprises transmitting multiple transmit beams including the first random access message for each of multiple receive beams associated with the second UE.

11. The method of claim 1, wherein the one or more parameters include one or more of an indication of time or frequency resources over which to at least one of transmit the first random access message or receive the second random access message, or an indication of one or more beams to use to at least one of transmit the first random access message or receive the second random access message.

12. An apparatus for wireless communication, comprising:
   a transceiver;
   a memory configured to store instructions; and
   one or more processors communicatively coupled with the transceiver and the memory, wherein the one or more processors are configured to:
     receive, from a base station, one or more parameters for performing a random access procedure with a second UE over a sidelink;
     generate a random access sequence based on an identifier of the apparatus;
     transmit, to the second UE and based on the random access sequence, a first random access message as part of the random access procedure over the sidelink; and
     receive, from the second UE and in response to transmitting the first random access message, a second random access message as part of the random access procedure over the sidelink, wherein at least one of transmitting the first random access message or receiving the second random access message are based on the one or more parameters.

13. The apparatus of claim 12, wherein the one or more processors are configured to transmit the first random access message at a fixed power.

14. The apparatus of claim 12, wherein the one or more parameters include a second identifier of the second UE, and wherein the one or more processers are further configured to confirm that the second random access message is from the second UE based at least in part on comparing a received identifier in the second random access message to the second identifier of the one or more parameters.

* * * * *